United States Patent
Tokushima

(10) Patent No.: US 9,639,789 B2
(45) Date of Patent: May 2, 2017

(54) IMAGE PROCESSING SYSTEM, AND METHOD OF CONTROLLING IMAGE PROCESSING SYSTEM

(71) Applicant: Yuji Tokushima, Kanagawa (JP)

(72) Inventor: Yuji Tokushima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/055,869

(22) Filed: Feb. 29, 2016

(65) Prior Publication Data
US 2016/0259999 A1    Sep. 8, 2016

(30) Foreign Application Priority Data
Mar. 2, 2015  (JP) .................... 2015-040761

(51) Int. Cl.
G06K 15/02    (2006.01)
G06F 3/12     (2006.01)
G06T 11/00    (2006.01)

(52) U.S. Cl.
CPC .......... *G06K 15/1859* (2013.01); *G06F 3/12* (2013.01); *G06K 15/1855* (2013.01); *G06K 15/1867* (2013.01); *G06T 11/00* (2013.01)

(58) Field of Classification Search
CPC .... G06F 3/1243; G06F 3/1247; G06F 3/1253; G06F 3/1257; G06F 3/1259; G06F 3/1263; G06F 3/1267; G06F 3/1282; G06F 3/1286; G06F 3/1288; G06F 3/1291; G06K 15/1878; G06K 15/027; G06K 15/00

USPC ............. 358/1.15, 1.18, 1.9, 504, 406, 500; 382/162; 399/23, 49, 8, 81, 82; 709/203, 709/225

See application file for complete search history.

(56) References Cited

U.S. PATENT DOCUMENTS

| | | | | |
|---|---|---|---|---|
| 8,199,144 | B2* | 6/2012 | Sakura | G06F 3/1205 270/58.08 |
| 8,264,711 | B2* | 9/2012 | Takahashi | H04N 1/00204 358/1.13 |
| 8,274,693 | B2* | 9/2012 | Oshima | G06F 3/1208 358/1.1 |
| 8,773,715 | B2* | 7/2014 | Katayama | H04N 1/6055 345/594 |
| 9,338,328 | B2* | 5/2016 | Itoh | H04N 1/6077 |
| 9,363,395 | B2* | 6/2016 | Ishiguro | H04N 1/00477 |

(Continued)

FOREIGN PATENT DOCUMENTS

JP    2004-246583    9/2004

*Primary Examiner* — Negussie Worku
(74) *Attorney, Agent, or Firm* — Cooper & Dunham LLP

(57) ABSTRACT

An image processing system includes a process execution control apparatus to control an execution of processes, and an image generation-output control apparatus to control an execution of an image generation-output operation. The process execution control apparatus includes a control-side drawing information generator to generate drawing information, and a process allocator to allocate a plurality of text information adding processes to the process execution control apparatus and the image generation-output control apparatus when generating the drawing information. The image generation-output control apparatus includes an output-side drawing information generator corresponding to the control-side drawing information generator.

11 Claims, 20 Drawing Sheets

(56) References Cited

U.S. PATENT DOCUMENTS

| | | | | |
|---|---|---|---|---|
| 9,424,498 B2* | 8/2016 | Hosomi | ............. | G06K 15/1806 |
| 2003/0080958 A1* | 5/2003 | Matsumoto | ........... | G06T 15/405 |
| | | | | 345/421 |
| 2012/0243037 A1* | 9/2012 | Toyoda | ................. | G06F 3/1207 |
| | | | | 358/1.15 |
| 2014/0253979 A1* | 9/2014 | Sasaki | ................ | H04N 1/00225 |
| | | | | 358/474 |
| 2015/0077773 A1* | 3/2015 | Inoue | ................ | G06K 15/1859 |
| | | | | 358/1.9 |
| 2015/0153971 A1* | 6/2015 | Aoki | .................... | G06F 3/1206 |
| | | | | 358/1.15 |
| 2016/0259998 A1* | 9/2016 | Miyagawa | ......... | G06K 15/1831 |
| 2016/0260000 A1* | 9/2016 | Yamakawa | ........ | G06K 15/1867 |
| 2016/0275386 A1* | 9/2016 | Aoki | ................. | G06K 15/4015 |

* cited by examiner

FIG. 3

```
JDF INFORMATION

JOB INFORMATION                            RIP STATUS
  NUMBER OF COPIES         : XX COPIES       PRE-FRIGHT   : NotYet
  NUMBER OF TOTAL PAGES    : XX PAGES        NORMALIZE    : NotYet
  RIP CONTROL MODE         : PAGE MODE       FONT         : NotYet
                                             LAYOUT       : NotYet
EDIT INFORMATION                             MARK         : NotYet
  ORIENTATION INFORMATION  : PORTRAIT        CMM          : NotYet
  PRINT FACE INFORMATION   : DUPLEX          TRAPPING     : NotYet
  ROTATION                 : 90 DEGREES      CALIBRATION  : NotYet
  ENLARGE/REDUCE           : 125%            SCREENING    : NotYet
  IMAGE POSITION                               . . .
    OFFSET                 : XX
    POSITION ADJUSTMENT    : XX             RIP DEVICE DESIGNATION
    INFORMATION                               PRE-FRIGHT   : HWF SERVER
  LAYOUT INFORMATION                          NORMALIZE    : HWF SERVER
    CUSTOM-IN-POSITION     : XX               FONT         : DFE (ENGINE A)
    NUMBER OF PAGES        : 2 IN 1           LAYOUT       : DFE (ENGINE A)
    IMPOSITION INFORMATION : LEFT TO          MARK         : DFE (ENGINE B)
                             RIGHT
    PAGE SEQUENCE          : XX               CMM          : DFE (ENGINE A)
    INFORMATION                               TRAPPING     : DFE (ENGINE A)
    CREEP POSITION         : XX               CALIBRATION  : DFE (ENGINE A)
    INFORMATION                               SCREENING    : DFE (ENGINE A)
  MARGIN INFORMATION       : XX                 . . .
  CROP MARK INFORMATION
    CENTER CROP MARK       : XX             DEVICE        : DIGITAL PRINTER
    INFORMATION                             DESIGNATION
    CORNER CROP MARK       : XX

FINISHING INFORMATION
  COLLATE INFORMATION      : PAGE BY PAGE
  STAPLE/BINDING           : STAPLE
  INFORMATION
  PUNCH INFORMATION        : XX
  FOLDING INFORMATION      : XX
  TRIMMING                 : XX
  OUTPUT-TRAY INFORMATION  : TRAY XX
  INPUT-TRAY INFORMATION   : TRAY XX
  COVER SHEET INFORMATION  : XX
       . . .
```

FIG. 5

WORKFLOW INFORMATION
1) INPUT OF DATA
2) HWF SERVER (RIP)
3) PREVIEW
4) TRANSMISSION TO DFE
5) POST PROCESSING
. . .

FIG. 7

| JDF INFORMATION | JOB ATTRIBUTE IN DFE |
|---|---|
| A-AMOUNT | NUMBER OF COPIES |
| A-ROTATE | ROTATION |
| . . . | |

FIG. 8

```
RIP PARAMETER

TYPE OF INPUT/OUTPUT DATA   : JDF, PDL
DATA READING INFORMATION    : XXXX
RIP CONTROL MODE            : PAGE MODE
    . . .

INPUT/OUTPUT IMAGE INFORMATION
  INFORMATION OF OUTPUT IMAGE

. . .

INFORMATION OF INPUT IMAGE

. . .

INFORMATION OF IMAGE PROCESSING

. . .

PDL INFORMATION
  DATA AREA                 : XXXX
  SIZE INFORMATION          : XXXX
  DATA ARRANGEMENT          : XXXX

RIP ENGINE IDENTIFICATION INFORMATION   : ENGINE A
```

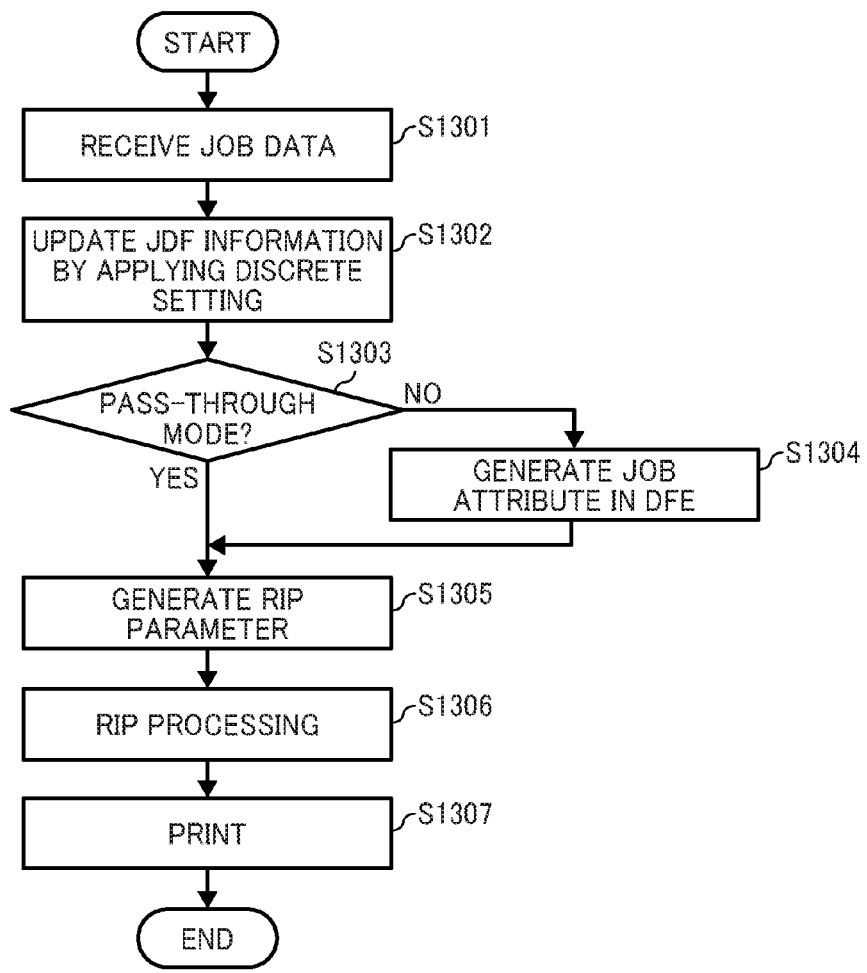

FIG. 16

```
JDF INFORMATION
  ......
       MARK INFORMATION
          MARK DATA FILE                        : XX
          MARK DESIGNATION PAGE INFORMATION : XX
          MARK POSITION INFORMATION            : XX
          MARK SIZE INFORMATION                : XX
          MARK ORIENTATION INFORMATION         : XX
          MARK TYPE INFORMATION                : XX

CHANGEABLE MARK INFORMATION
          HWF CHANGEABLE MARK
             POSITION INFORMATION  : RIGHT MARGIN, 1ST LINE, LEFT END
             ITEM INFORMATION      : DEVICE NAME
          HWF CHANGEABLE MARK
             POSITION INFORMATION  : RIGHT MARGIN, 1ST LINE, CENTER
             ITEM INFORMATION      : OUTPUT DATE
          ...                       ...

DFE CHANGEABLE MARK
             POSITION INFORMATION  : RIGHT MARGIN, 2ND LINE, LEFT END
             ITEM INFORMATION      : DEVICE NAME
          DFE CHANGEABLE MARK
             POSITION INFORMATION  : RIGHT MARGIN, 2ND LINE, CENTER
             ITEM INFORMATION      : PRINT DATE
          ...                       ...

| ITEM INFORMATION | DEVICE | CHANGEABLE MARK ITEM INFORMATION |
|---|---|---|
| DEVICE NAME | HWF | DEVICE NAME |
| | DFE | DEVICE NAME |
| OUTPUT DATE | HWF | OUTPUT DATE |
| | DFE | PRINTED DATE |
| | DFE | RE-PRINTED DATE |
| OPERATOR NAME | HWF | OPERATOR NAME |
| | DFE | OPERATOR NAME |
| SHEET INFORMATION | DFE | SHEET INFORMATION |
| PAGE NUMBER | HWF | PAGE NUMBER |
| | DFE | PAGE NUMBER |
| ...... | | |

FIG. 21

```
RIP PARAMETER
      ......
      MARK INFORMATION
         NON-CHANGEABLE MARK INFORMATION
            MARK DATA                        : XXXXXX
         CHANGEABLE MARK INFORMATION
            ALLOCATION DEVICE                : HWF
            ITEM INFORMATION                 : XXXXXXX
            POSITION INFORMATION             : XXXXXX
         CHANGEABLE MARK INFORMATION
            ALLOCATION DEVICE                : DFE
            ITEM INFORMATION                 : XXXXXX
            POSITION INFORMATION             : XXXXXX

JOB NAME: XXX
DEVICE NAME: HWF—"A"   OUTPUT DATE: 20XX/XX/XX 15:24   OPERATOR NAME: OPERATOR "A"
DEVICE NAME: PRINTER "A"   PRINT DATE: 20XX/XX/XX 17:10   OPERATOR NAME: OPERATOR "B"

FIG. 23

JOB NAME: XXX
DEVICE NAME: HWF—"A"   OUTPUT DATE: 20XX/XX/XX 15:24   OPERATOR NAME: OPERATOR "A"
DEVICE NAME: PRINTER "A" ... PAGES: 1-4
DEVICE NAME: PRINTER "B" ... PAGES: 5-10
......

IMAGE PROCESSING SYSTEM, AND METHOD OF CONTROLLING IMAGE PROCESSING SYSTEM

CROSS-REFERENCE TO RELATED APPLICATION

This application claims priority pursuant to 35 U.S.C. §119(a) to Japanese Patent Application No. 2015-040761, filed on Mar. 2, 2015 in the Japan Patent Office, the disclosure of which is incorporated by reference herein in its entirety.

BACKGROUND

Technical Field

The present invention relates to an image processing system, and a method of controlling the image processing system.

Background Art

Systems that can define and control various processes for generating a printed product by using a data format such as job definition format (JDF) are known. This system can control various types of printers such as offset printers and digital printers collectively. This system can be referred to a hybrid work flow (HWF) system, and a server that controls the HWF system can be referred to a HWF server.

As to the HWF system, when the offset printer and the digital printer independently perform a printing operation based on the same print data, it is required to print the same image having no difference of font, color tone, layout or the like between an image printed by the offset printer and an image printed by the digital printer. Therefore, the same raster image processor (RIP) engine that generates raster data based on print data is disposed in each one of the offset printer and the digital printer. In this description, a term of the "same RIP engine" is used to indicate that one same type of RIP engine is disposed in each of different apparatuses. The raster data is data that is referred at a final stage when a printing operation is performed.

Typically, the RIP engine is disposed in the HWF server. When the offset printer performs a printing operation, the RIP engine in the HWF server generates raster data (hereinafter, "RIP processing"), and the raster data is transferred to a computer-to-plate (CTP) that generates a plate for the offset printer.

In this configuration of the HWF system, when the digital printer performs a printing operation, the RIP engine in the HWF server generates raster data, and transfers the raster data to the digital printer to execute the printing operation. Specifically, a digital front end (DFE) of the digital printer receives print data, and performs the RIP processing to execute the printing operation by using a printer engine.

When the digital printer performs the printing operation in the HWF system, the DFE receives data from the HWF server, and the DFE controls the printer engine of the digital printer to execute the printing operation. Therefore, as described above, the same RIP engine is disposed in the offset printer and also in the DFE.

Further, when the print output operation is executed at each of the plurality of printers, graphic data of fonts are embedded in print data so that printout results by the plurality of printers have no differences due to differences of font data installed to each of the plurality of different printers.

As above described, the same type of RIP engine is disposed in the offset printer and also in the DFE configuring the HWF system. Therefore, when the digital printer executes a print output operation, it is preferable to perform the distributed processing by using the HWF server and the DFE.

As to the distributed processing, a mark processing is performed at any one of the HWF server and the DFE to designate graphic information of marks, and to superimpose the designated marks on a target print image as an application of the marks to the target print image. The marks include, for example, text marks configured by various text information related to a plurality of processes at the HWF system such as a printed date and an operator name.

The text information configuring the text mark may become different depending on whether information is acquired by or through the HWF server or the DFE. For example, an operator of the HWF server that inputs job data to the HWF server, and an operator of the DFE that edits the job data transmitted from the HWF server may be typically different persons.

Therefore, information of the text mark may become different when the HWF server executes the mark processing and when the DFE server executes the mark processing, in which required information may not be included in the text mark in some cases. A technology to evade different printout results due to different font data is known, but this technology cannot evade difference of information of text mark. Further, some information can be acquired by or through only one of the HWF server and the DFE. Therefore, if the mark processing is executed at one device, required information acquirable only by other device cannot be included in the text mark.

SUMMARY

As one aspect of the present invention, an image processing system for sequentially executing a plurality of processes is devised. The image processing system includes a process execution control apparatus to control an execution of the plurality of processes; and an image generation-output control apparatus to control an execution of an image generation-output operation. The process execution control apparatus includes a control-side drawing information generator to generate drawing information to be referred by an image forming apparatus in performing the image generation-output operation, based on information of a target image to be output, and an process allocator to allocate a plurality of text information adding processes to the process execution control apparatus and the image generation-output control apparatus when generating the drawing information, the text information adding processes each adding text information to the information of the target image. The image generation-output control apparatus includes an output-side drawing information generator corresponding to the control-side drawing information generator. The process allocator allocates the text information adding processes to the process execution control apparatus and the image generation-output control apparatus for each of the text information acquirable from different information sources through the process execution control apparatus and the image generation-output control apparatus. The control-side drawing information generator acquires first apparatus identification information identifying a first apparatus disposed with the control-side drawing information generator, determines the text information adding processes allocated to the process execution control apparatus based on the acquired first apparatus identification information, and executes one or more of the text information adding processes allocated to the process execution control apparatus based on a first determination result. The output-side drawing information generator acquires second apparatus identification information identifying a second apparatus disposed with the control-side drawing information generator based on the acquired second apparatus identification information, determines the text information adding processes allocated to the image generation-output control apparatus based on the acquired apparatus identification information, and executes one or more of the text information adding processes allocated to the image generation-output control apparatus based on a second determination result.

As another aspect of the present invention, a method of controlling an image processing system for sequentially executing a plurality of processes is devised. The image processing system includes a process execution control apparatus to control an execution of the plurality of processes, and an image generation-output control apparatus to control an execution of image generation-output operation. The method includes generating first drawing information to be referred by an image forming apparatus when the image forming apparatus performs the image generation-output operation based on information of an target image to be output by the process execution control apparatus; generating second drawing information based on the information of the target image at the image generation-output control apparatus in view of the first drawing information generated at the process execution control apparatus; allocating a plurality of text information adding processes to the process execution control apparatus and the image generation-output control apparatus when generating the first drawing information or the second drawing information, the text information adding processes each adding text information to the information of the target image and each acquirable from different information sources through the process execution control apparatus and the image generation-output control apparatus; executing one or more of the text information adding processes allocated to the process execution control apparatus at the process execution control apparatus; and executing one or more of the text information adding processes allocated to the image generation-output control apparatus at the image generation-output control apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 3 is an example of JDF information of one or more example embodiments of the present invention;

FIG. 5 is an example of workflow information of one or more example embodiments of the present invention;

FIG. 7 is an example of a conversion table of one or more example embodiments of the present invention;

FIG. 8 is an example of RIP parameter of one or more example embodiments of the present invention;

FIG. 12 is an example of information includable in a job dividing request of one or more example embodiments of the present invention;

FIG. 13 is a flow chart showing the steps of processing in the DFE of one or more example embodiments of the present invention;

FIG. 16 is an example of JDF information of one or more example embodiments of the present invention;

FIG. 19 is an example of allocation information of one or more example embodiments of the present invention;

FIG. 21 is an example of RIP parameter of one or more example embodiments of the present invention;

FIG. 22 is an example of a mark processing result of text marks of one or more example embodiments of the present invention; and FIG. 23 is another example of a mark processing result of text marks of one or more example embodiments of the present invention.

Figure 1:
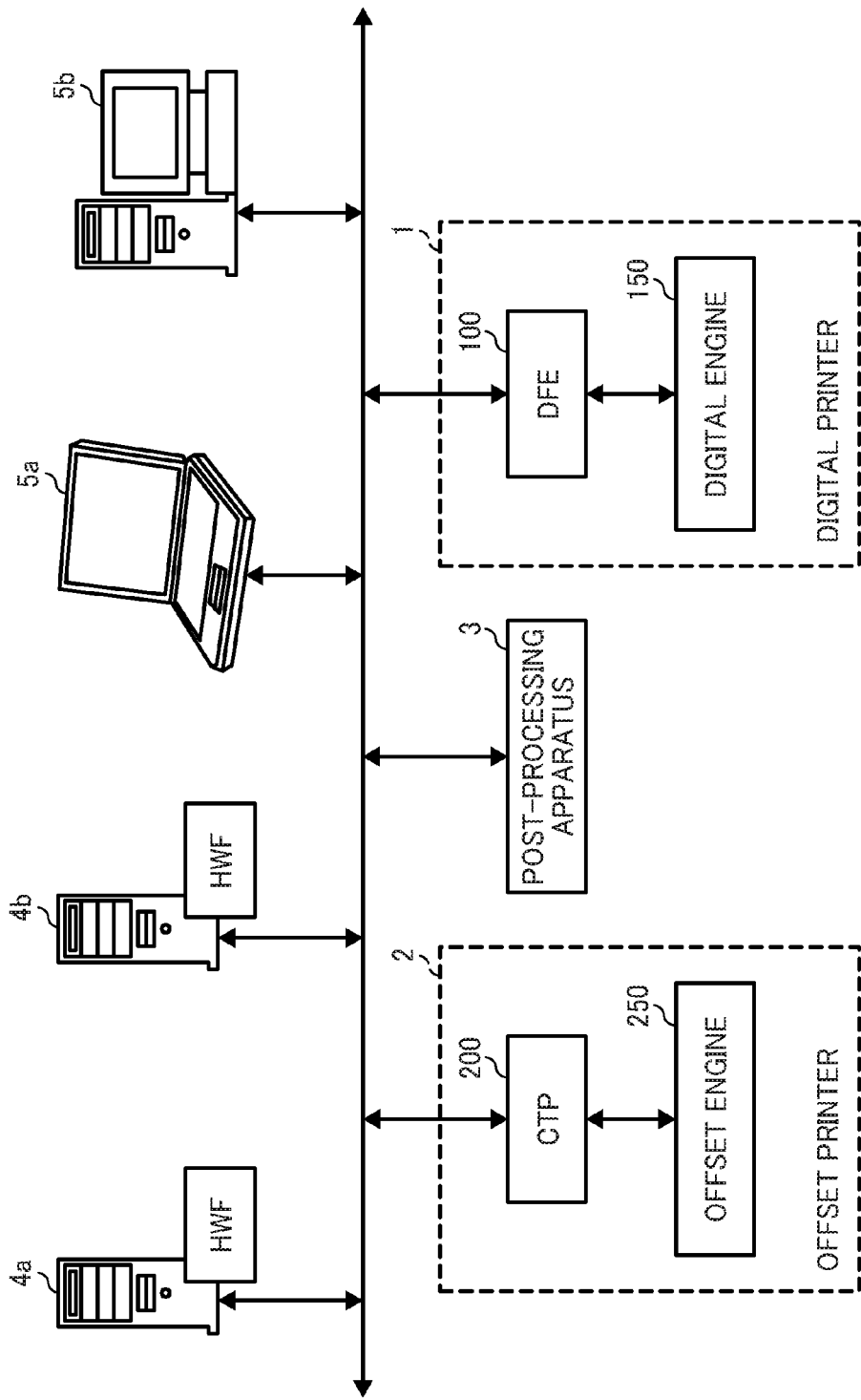
FIG. 1 is a schematic configuration of a system of one or more example embodiments of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more example embodiments are described hereinafter.

A description is given of an image processing system of one or more example embodiments of the present invention with reference to drawings. The image processing system includes, for example, an offset printer, and a digital printer, and a server, in which both of the offset printer and the digital printer can be controlled by the same server. Hereinafter, this image processing system is referred to a hybrid work flow (HWF) system.

FIG. 1 is a schematic configuration of the HWF system of one or more example embodiments of the present invention. As illustrated in FIG. 1, the HWF system includes, for example, a digital printer 1, an offset printer 2, a post-processing apparatus 3, HWF servers 4a and 4b (hereinafter, collectively referred to HWF server 4 as required), and client terminals 5a and 5b (hereinafter, collectively referred to client terminal 5 as required) connectable with one to another via a network.

The digital printer 1 is an example of printers that can generate and output images using an electrophotography method and an inkjet method without using a plate. The digital printer 1 includes, for example, a digital front end (DFE) 100, and a digital engine 150. The DFE 100 can be used as an image generation-output control apparatus, which is a controller to control the digital engine 150 to perform a print output operation. Further, the digital engine 150 can be used as an image forming apparatus. Therefore, the DFE 100 includes a raster image processor (RIP) engine that generates raster data. The raster data is image data that is referred or used by the digital engine 150 when performing the print output operation. The raster data is used as drawing information or image drawing information.

The offset printer 2 is an example of printers that can generate and output images by using a plate. The offset printer 2 includes, for example, a computer-to-plate (CTP) 200, and an offset engine 250. The CTP 200 generates a plate based on raster data. The offset engine 250 can perform an offset printing by using the plate generated by the CTP 200.

The post-processing apparatus 3 can perform various post-processing such as punch, staple, and bookbinding to printed sheets output from the digital printer 1 and/or the offset printer 2. The HWF server 4 is a server installed with an HWF software program that is used to manage an image processing operation including inputting of job data including target image data of a print output operation, processing of the print output operation, and post-processing. The HWF server 4 manages the above mentioned various processing using information generated with a job definition format (JDF) (hereinafter, JDF information). The HWF server 4 can be used as a process execution control apparatus.

The HWF server 4 further includes a raster image processor (RIP) engine in the HWF server 4. When the offset printer 2 performs an offset printing operation (i.e., print output operation), the RIP engine generates raster data, and transmits the generated raster data to the CTP 200.

Further, when the digital printer 1 performs a printing operation (i.e., print output operation), the HWF server 4 transmits data to the DFE 10. Since the DFE 100 has the RIP engine as described above, the digital printer 1 can perform the print output operation even when the HWF server 4 transmits print data not processed by the RIP processing in the HWF server 4 to the DFE 100.

As to the HWF system, the same print data can be used for the print output operation by the digital printer 1 and the print output operation by the offset printer 2, in which the print output operation by the digital printer 1 and the print output operation by the offset printer 2 are performed independently. In this case, if the print output operation result by the digital printer 1 and the print output operation result by the offset printer 2 become different, a user feels oddness on a printed product. Therefore, it is preferable that the print output operation result by the digital printer 1 and the print output operation result by the offset printer 2 become substantially the same one.

The differences of print output operation results by using different devices or apparatuses may occur due to the RIP processing. Therefore, by using the same RIP engine for data or information processing at the digital printer 1 and data or information processing at the offset printer 2, the differences between the print output operation result by the digital printer 1 and the print output operation result by the offset printer 2 can be reduced.

Specifically, the RIP engine disposed in the HWF server 4 is an engine that can process data or information for both of the digital printer 1 and the offset printer 2, and the RIP engine disposed in the HWF server 4 can perform common processes for the digital printer 1 and the offset printer 2. Further, the RIP engine disposed in the DFE 100 and the RIP engine disposed in the HWF server 4 employ the same type of RIP engine.

With this configuration, the HWF server 4 and the DFE 100 are disposed with the same RIP engine having the same processing capability. Therefore, when a print output operation by the digital printer 1 is to be performed, the RIP processing by the HWF server 4 and the RIP processing by the DFE 100 can be combined, and performed preferably.

An operator of the HWF system can operate the HWF server 4 by using the client terminal 5 (i.e., information processing terminal). The client terminal 5 can be any terminal devices or apparatuses such as a general personal computer (PC), but not limited hereto. The operator operates the client terminal 5 to display a graphic user interface (GUI) used for operating the HWF server 4, in which the GUI can be used to input data and setting the JDF information. The JDF information is used as a process setting information.

Figure 2:
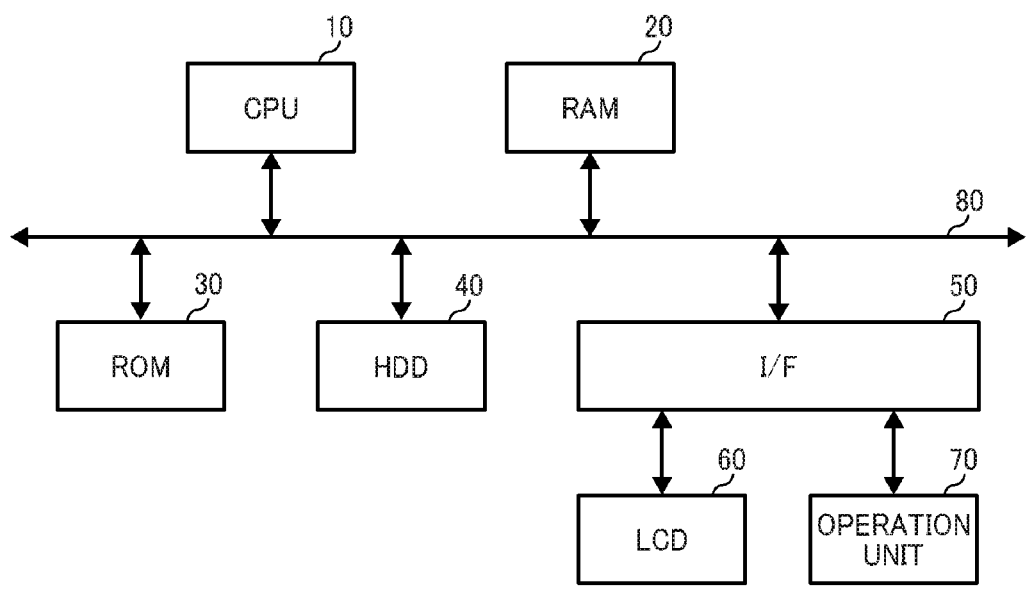
FIG. 2 is a schematic hardware configuration of an information processing apparatus of one or more example embodiments of the present invention.

A description is given of a hardware configuration of the DFE 100, the HWF server 4, and the client terminal 5 known as information processing apparatuses with reference to FIG. 2. As illustrated in FIG. 2, the information processing apparatus of the one or more example of the present invention has a configuration similar to general servers and personal computers (PC). Specifically, the information processing apparatus includes a central processing unit (CPU) 10, a random access memory (RAM) 20, a read only memory (ROM) 30, a hard disk drive (HDD) 40, and an interface (I/F) 50 that are connectable or couplable by a bus 80. Further, a liquid crystal display (LCD) 60 and an operation unit 70 are connectable or couplable to the interface (I/F) 50.

The CPU 10 is a computing unit such as circuitry that controls operations of the information processing apparatus as a whole. The RAM 20 is a volatile memory, to which information can be read and written with high speed, and the CPU 10 uses the RAM 20 as a working area when processing information or data. The ROM 30 is a non-volatile memory used as a read only memory, in which various programs such as firmware are stored. The HDD 40 is a non-volatile memory, to which information can be read and written. For example, the HDD 40 stores an operating system (OS), various control programs, and application programs.

The I/F 50 is connected or coupled to the bus 80, various units and networks, and controls the connection or coupling. The LCD 60 is a user interface that a user can check the status of the information processing apparatus visually. The operation unit 70 is a user interface such as a key board and a mouse that a user can input information to the information processing apparatus. Since the HWF server 4 is used as a server, a user interface such as LCD 60 and operation unit 70 can be omitted for the HWF server 4.

As to the above described hardware configuration of the information processing apparatus, the CPU 10 performs computing by loading programs stored in the ROM 30, the HDD 40, and/or an external memory such as an optical disk on the RAM 20 to configure a software control unit. With a combination of the software control unit and hardware, functional blocks can be devised for the DFE 100, the HWF server 4, and the client terminal 5.

A description is given of JDF information with reference to FIG. 3. FIG. 3 is an example of the JDF information. As illustrated in FIG. 3, the JDF information includes, for example, "job information" related to a job execution, "edit information" related to raster data, and "finishing information" related to post-processing. Further, the JDF information includes, for example, information of "RIP status," "RIP device designation," and "device designation."

As illustrated in FIG. 3, the "job information" includes information of, for example, "number of copies," "number of total pages," and "RIP control mode." The "number of copies" is information that designates the number of copies of an output target print data to be output as a printed product. The "number of total pages" is information that designates the number of total pages included in one printed product. The "RIP control mode" indicates a control mode of the RIP processing, in which a "page mode" and a "sheet mode" can be designated for the "RIP control mode."

The "edit information" includes, for example, "orientation information," "print face information," "rotation," "enlarge/reduce," "image position," "layout information," "margin information," and "crop mark information." The "orientation information" is information that designates a printing orientation of a sheet such as "portrait (vertical)" and "landscape (horizontal)." The "print face information" is information that designates a to-be-printed face such as "duplex" and "one face."

The "rotation" is information that designates a rotation angle of an image of an output target data. The "enlarge/reduce" is information that designates a size change ratio of an image of an output target data. As to the "image position," "offset" is information that designates an offset of an image of an output target data, and "position adjustment information" is information that designates a position adjustment value of an image of an output target data.

The "layout information" includes, for example, "custom imposition arrangement," "number of pages," "page sequence information," and "creep position information." The "custom imposition arrangement" is information that designates an arrangement on a custom face. The "number of pages" is information that designates the number of pages printed in one sheet. For example, when images of two pages are condensed and printed on one face of a single sheet, information of "2 in 1" is designated. The "page sequence information" is information that designates a sequence of pages to be printed. The "creep position information" is information that designates a value related to an adjustment of a creep position.

The "margin information" is information that designates a value related to a margin such as a fit box and a gutter. The "crop mark information" includes, for example, "center crop mark information" and "corner crop mark information." The "center crop mark information" is information that designates a value related to a center crop mark. The "corner crop mark information" is information that designates a value related to a corner crop mark.

The "finishing information" includes, for example, "Collate information," "staple/binding information," "punch information," "folding information," "trimming," "output-sheet size," "output tray information," "input tray information," and "cover sheet information." The "Collate information" is information that designates a page-by-page printing or a document-by-document printing when one document is to be printed with a plurality of numbers of copies.

The "staple/binding information" is information that designates a process related to staple/binding. The "punch information" is information that designates a process related to punch. The "folding information" is information that designates a process related to folding of sheets. The "trimming" is information that designates a process related to trimming of sheets.

The "output tray information" is information that designates an output tray. The "input tray information" is information that designates an input tray. The "cover sheet information" is information that designates a process related to a cover sheet.

The "RIP status" is used as execution status information indicating whether each of internal processes included in the RIP processing is already executed. In an example case of FIG. 3, the internal processes of RIP processing includes items such as "pre-fright," "normalize," "font," "layout," "mark," "CMM," "Trapping," "Calibration," and "Screening," and a processing status is set for each of the internal processes of RIP. In the example case of FIG. 3, the processing status of "NotYet" is set for the "RIP status" to indicate that "a concerned process is not yet processed". When each of the internal processes of RIP is executed, the status is updated to "Done" to indicate that "the concerned process is already processed."

The "RIP device designation" is information that designates a device to perform each of the internal processes of RIP processing. In the example case of FIG. 3, the "RIP device designation" designates the HWF server 4 or the DFE 100 to perform each of the internal processes of RIP processing. As illustrated in FIG. 3, each one of the internal processes of RIP processing is performed by setting any one of the "HWF server" and "DFE" for each of the internal processes of RIP processing. Further, when the "DFE" is set, information designating one of a plurality of RIP engines installed in the DFE 100 can be also designated such as "DFE (engine A)".

The "device designation" is information that designates a device that executes a print job. In the example case of FIG. 3, the "digital printer" is designated to execute a print job. The JDF information is used as process setting information including information of setting process contents for executing an image generation and output operation. Further, the JDF information can include various information other than information shown in FIG. 3. The above mentioned information will be described in detail later.

The JDF information shown in FIG. 3 can be generated by an operator. For example, the operator operates the client terminal 5 to display a GUI of the HWF server 4, and then the operator sets various items of the JDF information by using the GUI. The RIP engine installed in the HWF server 4 and the RIP engine installed the DFE 100 can perform the RIP processing based on the JDF information. Further, the post-processing apparatus 3 can perform the post-processing based on the JDF information.

Figure 4:
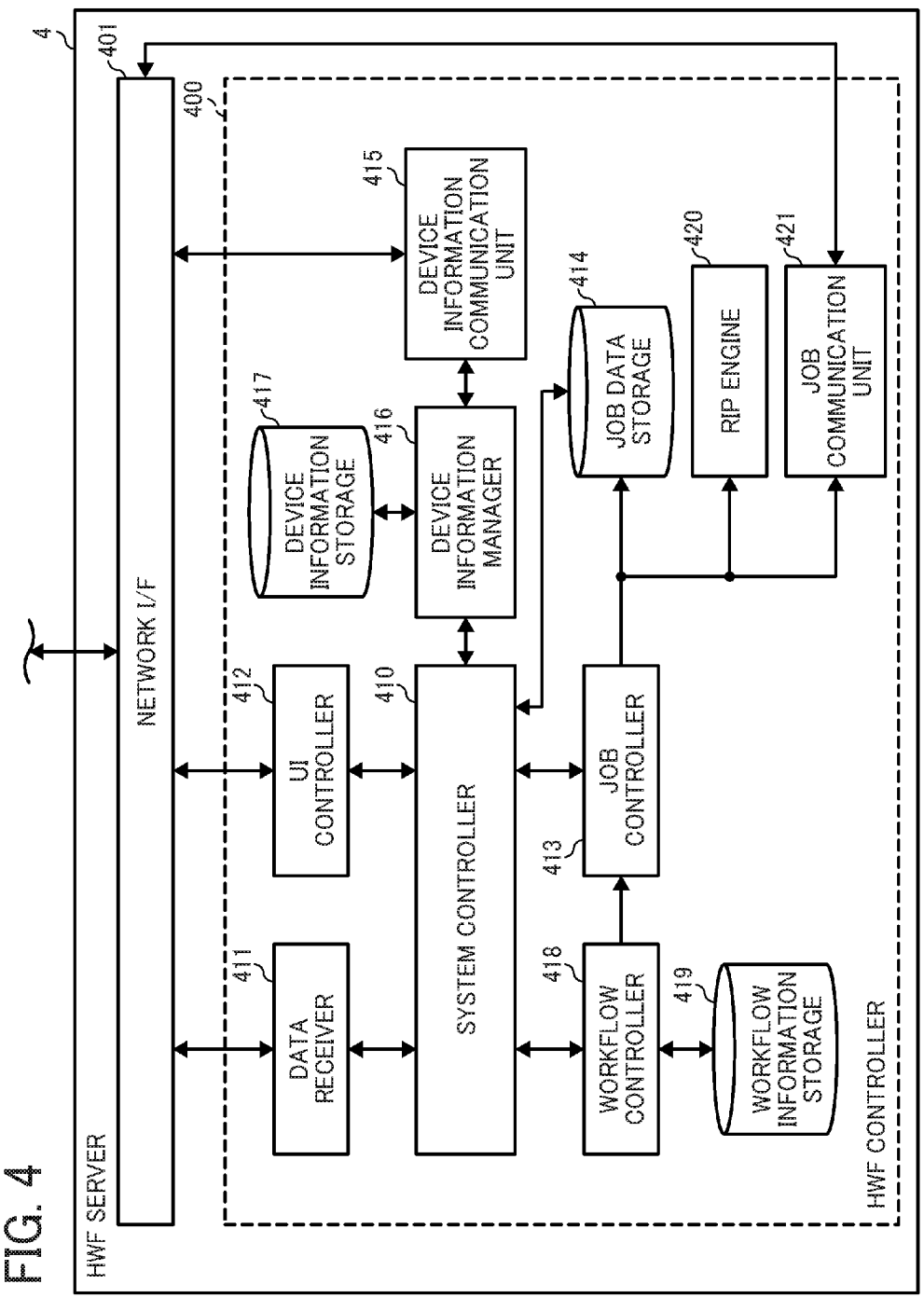
FIG. 4 is a functional configuration of a HWF server of one or more example embodiments of the present invention.

A description is given of a functional configuration of the HWF server 4 with reference to FIG. 4. As illustrated in FIG. 4, the HWF server 4 includes, for example, a HWF controller 400, and a network interface (I/F) 401. The network I/F 401 is an interface used for communicating information between the HWF server 4 and other devices or apparatuses available for use via a network.

The HWF controller 400 manages various processing such as an acquisition of job data of a print target, a generation of a print job, a management of a workflow, and an allocation of job data to the digital printer 1 and the offset printer 2. A process that job data of a print target is input to the HWF server 4, and acquired by the HWF controller 400 is a process of inputting data to the HWF system. The HWF controller 400 can be implemented by installing a specific software program such as a HWF software program in an information processing apparatus.

As illustrated in FIG. 4, the HWF controller 400 includes, for example, a system controller 410, a data receiver 411, a user interface (UI) controller 412, a job controller 413, a job data storage 414, a device information communication unit 415, a device information manager 416, a device information storage 417, a workflow controller 418, a workflow information storage 419, a RIP engine 420, and a job communication unit 421. The system controller 410 controls the HWF controller 400 as a whole. Therefore, the system controller 410 transmits commands to each of the units in the HWF controller 400 to implement each of the above described functions or capabilities of the HWF controller 400. The data receiver 411 receives job data to be printed from other system, or job data input by an operation of an operator.

The UI controller 412 controls an operation operable by an operator via the client terminal 5. For example, a graphical user interface (GUI) for operating the HWF server 4 is displayed on the client terminal 5, and the UI controller 412 acquires information of an operation work to the GUI displayed on the client terminal 5 via a network.

The UI controller 412 reports information of the operation acquired via the network to the system controller 410. The display of GUI on the client terminal 5 can be implemented by executing a software program installed in the client terminal 5, or by supplying information to the client terminal 5 from the UI controller 412 via the network.

The operator operates the GUI displayed on the client terminal 5 to select job data to be input as a print target. Then, the client terminal 5 transmits the selected job data to the HWF server 4, and the data receiver 411 acquires the selected job data. The system controller 410 registers the job data acquired by the data receiver 411 to the job data storage 414.

When the job data is to be transmitted from the client terminal 5 to the HWF server 4, the job data is generated in the client terminal 5 based on document data and/or image data selected at the client terminal 5, and then the job data is transmitted to the HWF server 4. The job data is described, for example, by page description language (PDL) format such as portable document format (PDF) and PostScript, and is used as a command information for generating and outputting image. The job data includes image information that becomes a target of image generation and output.

Further, the client terminal 5 can transmit job data of a print target to the HWF server 4 by using an application specific data format or a general image data format. In this configuration, the system controller 410 instructs the job controller 413 to generate job data based on the acquired data. The job controller 413 generates the job data based on the data of print target by using the RIP engine 420.

As described above, the data of print target registered in the job data storage 414 is PDL information. The PDL information can be, for example, primary data generated from the data of print target, or intermediate data, which is processed to the middle of the RIP processing. These information can be used as output-target image information, which is also referred to target image information of image generation-output operation. For example, the intermediate data may be stored in the job data storage 414 when the job data is processed to the middle of the RIP processing that is already started in the HWF server 4, or when the job data is registered in the HWF server 4 with a condition of the intermediate data. Hereinafter, the "PDL information" indicates primary data that is not yet processed by the RIP processing, and the intermediate data, which is processed to the middle of the RIP processing (i.e., processing-not-completed data) in this description.

Further, as described above, the JDF information shown in FIG. 3 can be set and generated by an operation of an operator to the GUI displayed on the client terminal 5. The generated JDF information can be received by the data receiver 411 with the PDL information as the job data. The system controller 410 correlates the acquired JDF information and PDL information, and registers the JDF information and PDL information to the job data storage 414.

In this description, attribution information indicating job contents is described by using the JDF information, but not limited hereto. For example, the attribution information indicating job contents can be described by using other format such as print production format (PPF).

Further, the system controller 410 can divide the received job data as required based on an operation of an operator to a GUI displayed on the client terminal 5. For example, the system controller 410 can divide the received job data into a discrete unit of printing portion such as a unit of "page," and each one of the divided job data can be registered in the job data storage 414 as sub job data, in which the job data is configured by the plurality of the sub-job data.

When an output-destination device is selected for each of the sub job data by an operation of an operator to a GUI displayed on the client terminal 5, the operator's selection result is correlated with the sub-job data, and then stored in the job data storage 414. The output-destination device can be set selectively for each of the sub-job data. For example, the digital printer 1 can be selected for printing sub job data corresponding to a cover of the received job data, and the offset printer 2 can be selected for printing sub-job data corresponding to a main contents of the received job data.

The device information manager 416 acquires information of available devices or apparatuses included in the HWF system such as the digital printer 1, the offset printer 2, the post-processing apparatus 3 or the like, and the device information manager 416 stores information of the available devices or apparatuses in the device information storage 417, and manages the information of the available device or apparatuses. The information of available devices includes, for example, a network address allocated to each device when the device is connected or coupled to the network, and device capability information of each device. The device capability information includes, for example, printing speed, available post-processing capability, and operational condition.

The device information communication unit 415 can acquire information of the available devices included in the HWF system at regular intervals via the network I/F 401. With this configuration, the device information manager 416 can update information of the available devices stored in the device information storage 417 at regular intervals. Therefore, even if the information of the available devices changes over the time, information stored in the device information storage 417 can be updated and maintained at the latest or up-to-date status.

The workflow controller 418 determines an execution sequence of a plurality of processes to be executed for the job data registered in the job data storage 414 in the HWF system, and stores information of the execution sequence in the workflow information storage 419. Based on the execution sequence set for each of processes in a workflow in advance, the workflow controller 418 can control the execution sequence, in which when one process completes, the sequence proceeds to the next process.

The workflow information stored in the workflow information storage 419 specifies the execution sequence of each of processes executable in the HWF system, in which the processes are sequentially arranged based on the designated execution sequence. FIG. 5 is an example of workflow information. Further, parameters, which are used when each of the processes is executed, can be designated as the JDF information as above described. The workflow information storage 419 registers the workflow information in advance based on an operation of an operator to the GUI displayed on the client terminal 5.

An execution instruction of the job data, registered in the HWF server 4, is reported to the system controller 410 via the UI controller 412 based on an operation of an operator to the GUI displayed on the client terminal 5. With this configuration, the system controller 410 can select the above described output-destination device.

When the output-destination device is selected by using the GUI displayed on the client terminal 5 as described above, the system controller 410 selects the output-destination device based on a designation of the output-destination device. Further, the output-destination device can be selected automatically based on a comparison of job contents and a device property.

When the output-destination device is selected automatically based on the comparison of job contents and the device property, the system controller 410 acquires information of device available for use from the device information manager 416. When the output-destination device is determined as above described, the system controller 410 assigns information indicating the determined output-destination device to the JDF information.

After determining the output-destination device, the system controller 410 instructs the workflow controller 418 to execute a job. In this process, the workflow information, registered in the workflow information storage 419 in advance based on an operation of an operator, can be used. Further, a new workflow information can be generated and then used based on contents set by the operator.

After receiving the execution instruction from the system controller 410, the workflow controller 418 instructs the job controller 413 to execute each of the processes based on the designated execution sequence of the designated workflow information of the newly generated workflow information. Therefore, the workflow controller 418 can be used as a process execution controller.

After receiving the execution instruction, the job controller 413 inputs the above described PDL information and JDF information to the RIP engine 420 to execute the RIP processing. The JDF information includes information that indicates which one of the HWF server 4 and the DFE 100 is used for processing each of internal processes of the RIP processing by using the RIP engine.

The job controller 413 refers or checks allocation information of the RIP processing included in the JDF information. If one process designated by the workflow controller 418 is a process to be executed by the HWF server 4, the job controller 413 instructs the RIP engine 420 to execute the designated one process. Based on the instruction from the job controller 413, the RIP engine 420 executes the RIP processing based on parameters designated in the JDF information.

After executing the RIP processing, the RIP engine 420 updates the RIP status of each of the processes executed by the RIP processing. With this configuration, the status of each of the internal processes of the RIP processing executed by the HWF server 4 is changed from "NotYet" to "Done." The RIP engine 420 can be used as a control-side image drawing information generator or control-drawing information generator (or first image information generator).

The RIP-executed result data generated by executing the RIP processing is any one of PDL information, intermediate data, and raster data. Any one of the PDL information, intermediate data, or raster data are generated depending on the internal process of the RIP processing. Specifically, as the sequence proceeds, the intermediate data is generated from primary data such as PDL information, and the raster data is generated as final data from the intermediate data. The RIP-executed result data is correlated with a being-executed job, and stored in the job data storage 414.

When each one of the internal processes of RIP processing is completed, the RIP engine 420 reports the completion of each one of the internal processes to the job controller 413, and the job controller 413 reports the completion of each one of the internal processes to the workflow controller 418. With this configuration, the workflow controller 418 starts to control a subsequent or next process based on the workflow information.

If the job contents received from the workflow controller 418 is a request to the other system, the job controller 413 inputs job data, compatible to other system, to the job communication unit 421, and instructs the job communication unit 421 to transmit the job data. If the job data is to be transmitted to the offset printer 2, the job data of a print target is converted to raster data, and then transmitted to the offset printer 2 as the job data.

Further, if the job data is to be transmitted to the digital printer 1, the job controller 413 inputs the job data to the job communication unit 421 while designating a RIP engine that can respond with the RIP engine 420 from a plurality of RIP engines included in the DFE 100. With this configuration, the job communication unit 421 transmits the job data to the DFE 100 by designating the RIP engine that is the same type of the RIP engine 420.

The job communication unit 421 transmits the job data such as a package of PDL information and JDF information or a package of intermediate data and JDF information to the DFE 100. Further, the PDL information or intermediate data can be transmitted to the DFE 100 separately from the JDF information, in which the PDL information or intermediate data can be prepared as external resource data, and the JDF information can include universal resource locators (URL) indicating a storage area of the PDL information or a storage of intermediate data. In this configuration, the DFE 100 that receives the JDF information can access the storage area specified by the URL to acquire the PDL information or intermediate data.

Figure 6:
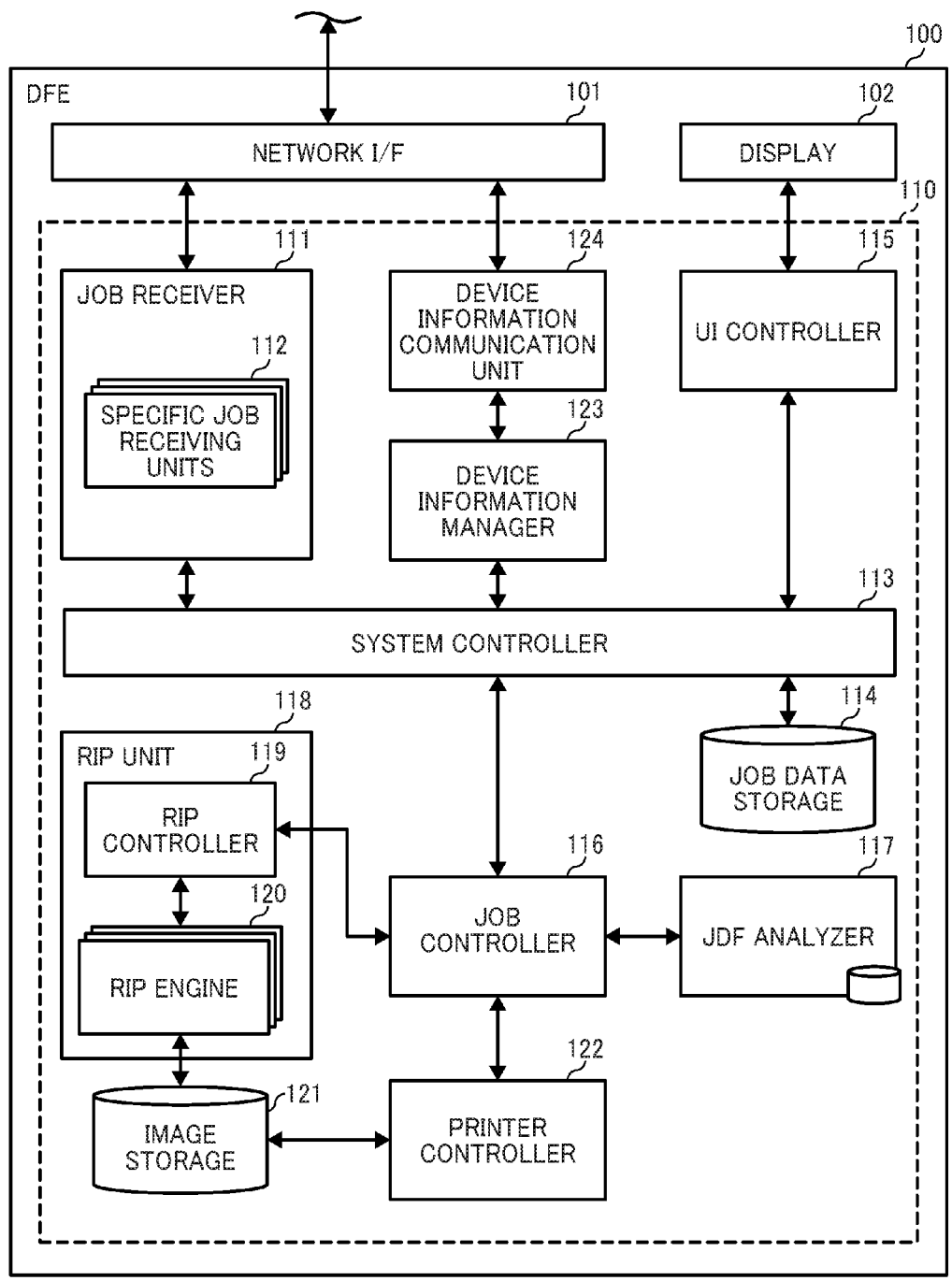
FIG. 6 is a functional configuration of a DFE of one or more example embodiments of the present invention.

A description is given of a functional configuration of the DFE 100 with reference to FIG. 6. When the DFE 100 receives job data from the HWF server 4, the DFE 100 controls the received job, an execution of the RIP processing, and the digital engine 150. The HWF server 4 transmits the job data to the DFE 100 and instructs the DFE 100 to execute a print output operation by using the digital engine 150. Therefore, the DFE 100 can be used as a device to provide digital printing capability to the HWF server 4.

The job control performable by the DFE 100 is a process of controlling a series of processes such as a reception of job data, an analysis of JDF information, a generation of raster data, and a print output operation by the digital engine 150. The execution control of the RIP processing is a process of controlling the RIP engine to execute the RIP processing based on information generated by the analysis of the JDF information.

The information generatable by analyzing the JDF information means that information used for the RIP processing is extracted from the JDF information (FIG. 3), and is then converted to a data format processable by the DFE 100, which is referred to "job attribute in DFE" in this description. By executing the RIP processing by using the job attribute in DFE, the intermediate data and raster data can be generated.

The control of the digital engine 150 is a process of transmitting raster data and at least a part of the above described job attribute in DFE to the digital engine 150, and executing the print output operation by the digital engine 150. These capabilities can be implemented by each of units shown in FIG. 6. Each of the units shown in FIG. 6 can be implemented by activating the hardware (FIG. 2) by loading programs stored in the ROM 30 on the RAM 20 and executing the loaded programs by the CPU 10.

The DFE 100 can include a plurality of RIP engines therein, and each of the plurality of RIP engines can respond to each of RIP engines of other available devices. Specifically, each of the plurality of RIP engines of the DFE 100 can respond to each of RIP engines of other available devices that may transmit job data to the DFE 100 in the HWF system. Since the HWF servers 4a and 4b include different RIP engines, a plurality of the RIP engines that can respond to the RIP engines of HWF servers 4a and 4b is disposed in the DFE 100.

As illustrated in FIG. 6, the DFE 100 includes, for example, a network I/F 101, a DFE controller 110, and a display 102. The DFE controller 110 includes, for example, a job receiver 111 including a plurality of specific job receiving units 112, a system controller 113, a job data storage 114, a UI controller 115, a job controller 116, a JDF analyzer 117, a RIP unit 118, a RIP controller 119, a RIP engine 120, an image storage 121, a printer controller 122, a device information manager 123, a device information communication unit 124, and an imposition converter 125. In this configuration, each of the specific job receiving units 112 receives job data from the HWF server 4 via the network I/F 101, and each of the plurality of specific job receiving units 112 corresponds to each of the plurality of RIP engines disposed in the DFE 100. In this configuration, the specific job receiving unit 112 can be used as a specific receiver.

As described above, when job data is transmitted from the HWF server 4 to the DFE 100, the corresponding RIP engine is designated, and the job data is transmitted to the corresponding RIP engine. Therefore, the specific job receiving unit 112 in the job receiver 111, corresponding to the designated RIP engine, can receive the job data.

In the above described configuration, the job data can be input to the DFE 100 from the HWF server 4 via a network. Further, the job data can be input to the DFE 100 via a portable memory such as a USB memory. In this description, the JDF information is included in the job data. If the JDF information is not included in the job data, the job receiver 111 generates dummy JDF information, and assigns the dummy JDF information to the job data.

The specific job receiving units 112 can be disposed for each of the above described RIP engines. Further, each of the specific job receiving unit 112 can be used as a virtual printer set with job contents in advance. Specifically, each of the specific job receiving units 112 can be set for the corresponding RIP engine disposed in the DFE 100 and job contents, and then, by designating any one of the plurality of specific job receiving units 112, the corresponding job can be executed with the contents set in advance.

Further, as to the one or more example embodiment of the present invention, the specific job receiving unit 112 can be set with a "pass-through mode." As illustrated in FIG. 6, the DFE 100 can include the JDF analyzer 117, independently from the RIP engine, to perform an analysis of JDF information. However, when the "pass-through mode" is activated, the RIP engine performs an analysis of the JDF information while the analysis of JDF information by the JDF analyzer 117 is not activated.

By employing this configuration having the "pass-through mode," JDF information using a format not processable by the JDF analyzer 117 can be used, a RIP engine that is difficult to include JDF analysis capability outside the RIP engine can be employed for the HWF server 4 and the DFE 100. As to the one or more example embodiments, the "pass-through mode" may be used when a plurality of processes is distributed between the RIP engine 420 disposed in the HWF server 4 and the RIP engine 120 disposed in the DFE 100, in which the RIP engine 120 and the RIP engine 420 employs the same type of engine having the same capability. The RIP engine 120 can be used as an output-side image drawing information generator or output-side drawing information generator (or second image information generator).

When the RIP processing is performed by the HWF server 4 and the DFE 100 as the distributed processing, it is preferable that the RIP processing is performed as one sequential processing as much as possible without being perceived as separate processing by the HWF server 4 the DFE 100. Therefore, when data that is processed to the middle of the entire processing by the HWF server 4 is input to the DFE 100, it is preferable that the processing is performed by the DFE 100 as a process being continued from the HWF server 4 while omitting the JDF analysis process that is performed when unprocessed job data is input.

As to the one or more example embodiments, the RIP engine having the same capability is disposed in each of the HWF server 4 and the DFE 100, with which the above described RIP processing can be controlled and performed preferably. Further, in this configuration, it is preferable that data processed by one RIP engine is transferred to another RIP engine as it is, which can be preferably implemented by using the "pass-through mode."

The system controller 113 stores the job data received by the specific job receiving unit 112 in the job data storage 114, or transfers the job data received by the specific job receiving unit 112 to the job controller 116. If the DFE 100 is devised to store the job data, the system controller 113 stores the job data in the job data storage 114. Further, if the JDF information includes a description whether the job data is to be stored in the job data storage 114 or not, the system controller 113 perform the processing in line with the description.

The job data can be stored in the job data storage 114, for example, when a preview of print contents is performed by the DFE 100. In this case, the system controller 113 acquires data of a print target included in the job data, which is PDL information and intermediate data, from the job data storage 114 to generate preview data, and transfers the preview data to the UI controller 115. With this configuration, the UI controller 115 controls the display 102 to display a preview of the print contents.

When the preview data is to be generated, the system controller 113 transfers the data of print target to the job controller 116, and requests the job controller 116 to generate the preview data. The job controller 116 transfers the data of print target to the RIP unit 118 to generate the preview data, and the job controller 116 receives the generated preview data, and transfers the generated preview data to the system controller 113.

Further, when an operator changes the JDF information for the DFE 100, the job data is stored in the job data storage 114. In this case, the system controller 113 acquires the JDF information from the job data storage 114, and transfers the JDF information to the UI controller 115. With this configuration, the JDF information of the job data is displayed on the display 102, and the operator can change the JDF information.

When the operator changes the JDF information by operating the DFE 100, the UI controller 115 receives the changed information, and reports the changed information to the system controller 113. The system controller 113 applies the received changed information to the target JDF information to update the target JDF information, and stores the updated target JDF information in the job data storage 114.

Then, when the system controller 113 receives a job execution instruction, the system controller 113 transfers the job data stored in the job data storage 114 to the job controller 116. The job execution instruction can be input from the HWF server 4 via a network, or can be input by an operation of an operator to the DFE 100. For example, if a job execution time is set in the JDF information, the system controller 113 transfers the job data stored in the job data storage 114 to the job controller 116 when the set time comes.

The job data storage 114 is a memory or a storage area to store the job data, which can be devised, for example, by the HDD 40 shown in FIG. 2. Further, the job data can be stored in a memory or a storage area connected to the DFE 100 via a universal serial bus (USB) interface, or can be stored in a memory device connected or coupled via a network.

As described above, the UI controller 115 controls the display 102 to display information, and receives an operation of an operator to the DFE 100. When the above described editing process is performed to the JDF information, the UI controller 115 interprets the JDF information, and displays contents of the print job on the display 102.

The job controller 116 controls the job execution when the job execution instruction is transmitted from the system controller 113. Specifically, the job controller 116 controls the JDF analysis process by the JDF analyzer 117, the RIP processing by the RIP unit 118, and the control of the digital engine 150 by the printer controller 122.

When the job controller 116 receives the job execution instruction from the system controller 113, the job controller 116 inputs the JDF information included in the job data to the JDF analyzer 117 to request a conversion of JDF. The JDF conversion request is a request of converting the JDF information described by a format used by an original or initial generator of the JDF information to a format decodable or processable by the RIP unit 118. Therefore, the JDF analyzer 117 can be used as a process setting information converter.

By contrast, when the above described "pass-through mode" is designated, the job controller 116 acquires the JDF information included in the job data from the system controller 113, and inputs the JDF information at it is to the RIP unit 118. The designation of "pass-through mode" can be described in the JDF information by using the specific job receiving unit 112.

The JDF analyzer 117 converts the JDF information described with the format used by the original generator to the format decodable or processable by the RIP unit 118. Therefore, the JDF analyzer 117 can be used as a command information converter that converts a format of command information received by the DFE 100 to a format decodable or processable by the DFE 100. The JDF analyzer 117 retains a conversion table therein, and extracts information required for the RIP unit 118 from information included in the JDF information, and converts a description format of the extracted information based on the conversion table. With this configuration, the above described job attribute in DFE can be generated.

FIG. 7 is an example of a conversion table retainable by the JDF analyzer 117. As illustrated in FIG. 7, the conversion table correlates a description format of JDF information and a description format of job attribute in DFE. For example, information of "number of copies" shown in FIG. 3 is described as "A-Amount" in the original or initial JDF information, and "A-Amount" is converted to a description of "number of copies" when generating the job attribute in DFE.

The job attribute in DFE can be generated based on a process by the JDF analyzer 117 using the conversion table shown in FIG. 7. Information described in the job attribute in DFE includes, for example, "job information," "edit information," "finishing information" or the like shown in FIG. 3.

The JDF analyzer 117 sets the "RIP control mode" to the job attribute in DFE when generating the job attribute in DFE. The "RIP control mode" includes a "page mode" and a "sheet mode." The JDF analyzer 117 assigns or allocates the "RIP control mode" based on a type of the specific job receiving unit 112 that has received the job data, job contents, and HWF software program installed in the HWF server 4 used as a transmission source of the job data.

In the configuration described in this specification, condensed printing for a print job can be set by using the "page mode." The "RIP control mode" will be described later in detail.

Based on the job attribute in DFE generated by the JDF analyzer 117, the job controller 116 generates "RIP parameter," and transfers the RIP parameter" to the RIP controller 119 in the RIP unit 118 to execute the RIP processing. With this configuration, the RIP unit 118 can execute the RIP processing based on the "RIP parameter."

FIG. 8 is an example of one set of RIP parameters of one or more example embodiments. The RIP parameters include, for example, "type of input/output data," "data reading information," and "RIP control mode" as header information. The "type of input/output data" designates the type of input/output data such as JDF, PDL or the like. The designatable format is, for example, JDF, PDL, text format, extension of image data, and intermediate data.

The "data reading information" includes information of a designation method and a designation position of reading position and writing position of the input/output data. The "RIP control mode" is information that designates the "page mode" and "sheet mode." The header information further includes, for example, information of "unit" used in the RIP parameter, and information of compression method of data.

The "input/output image information" includes, for example, "information of output image," "information of input image," and "information of image processing." The "information of output image" includes information of, for example, format, resolution, size, color separation, color shift, and page orientation of output image data. The "information of input image" includes information of, for example, format, resolution, page area, and color settings of input image data. Further, the "information of image processing" includes information of, for example, an offset of enlargement/reduction algorism, an object area, and an offset of halftone.

The "PDL information" is information related to PDL information used for the RIP parameter. The "PDL information" includes information of, for example, "data area," "size information," and "data arrangement method." In this description, the PDL information is data of print target in a job, and includes intermediate data. The "data area" designates information of an area where the PDL information is stored. The "size information" designates a data size of the PDL information. The "data arrangement method" designates a data arrangement pattern in a memory storing the PDL information such as "little big endian" and "big endian."

When the "pass-through mode" is used, the job controller 116 generates the RIP parameter based on the JDF information, and PDL information or intermediate data. In this case, each of items configuring the RIP parameter is set with information useable for referring corresponding items in JDF information.

As illustrated in FIG. 8, the RIP parameter includes the "RIP control mode." The RIP controller 119 controls the RIP engine 120 based on the "RIP control mode." Therefore, the sequence is set based on the "RIP control mode." As above described, the "page mode" and "sheet mode" can be set as the "RIP control mode."

The "page mode" and "sheet mode" are performed to a plurality of pages to generate raster data. As to the "page mode," the RIP processing is performed for each page of the plurality of pages, and then raster data condensing the plurality of RIP-processed pages on the single sheet is generated. As to the "sheet mode," a plurality of pages are condensed on a single sheet at first, and then the RIP processing is performed for each part (i.e., each page) of the single sheet to generate raster data condensing the plurality of pages on the single sheet.

Further, when the "pass-through mode" is set, the "pass-through mode" can be designated in the "RIP control mode." However, this is just one example. The "pass-through mode" can be described in an item other than the "RIP control mode."

Further, the job controller 116 sets "RIP engine identification information" in the RIP parameter. The "RIP engine identification information" is information for identifying each of a plurality of the RIP engines 120 included in the RIP unit 118. In this configuration, the same RIP engine is used in the HWF server 4 as the RIP engine 420, and in the DFE 100 as the RIP engine 120.

Therefore, the JDF information includes information for designating the specific job receiving unit 112 as described above, and the designated specific job receiving unit 112 receives the job data. Each one of the specific job receiving units 112 corresponds to any one of the RIP engines 120, and identification information of the corresponding RIP engine 120 is added to the received JDF information. Based on the identification information of the RIP engine 120 added to the JDF information, the job controller 116 adds the "RIP engine identification information" to the RIP parameter.

As to the RIP unit 118, the RIP controller 119 controls the plurality of RIP engines 120 to perform each of the internal processes of RIP processing based on the input RIP parameter to generate raster data. The capability of the RIP engine 120 will be described later in detail.

The image storage 121 is a memory or a storage area to store raster data generated by the RIP engine 120. The image storage 121 can be devised, for example, by the HDD 40 shown in FIG. 2. Further, the image storage 121 can be a memory or a storage area connected to the DFE 100 via a universal serial bus (USB) interface, or can be a memory device connected or coupled via a network.

The printer controller 122 is connected or coupled to the digital engine 150. The printer controller 122 reads raster data stored in the image storage 121, and transmits the raster data to the digital engine 150 to execute a print output operation. Further, the printer controller 122 acquires the finishing information included in the job attribute in DFE from the job controller 116 to control a finishing process.

The printer controller 122 communicates information with the digital engine 150 to acquire information of the digital engine 150. For example, when CIP4 standard is used, DevCaps standard is defined as the JDF information standard for communicating device property information with a printer. Further, printer information can be collected by using a communication protocol such as simple network management protocol (SNMP) and a database such as management information base (MIB).

The device information manager 123 manages the device information such as information of the DFE 100 and the digital engine 150. The device information includes, for example, information of the RIP engines 120 included in the RIP unit 118, and information of the specific job receiving units 112 in the job receiver 111. Further, the information of the specific job receiving units 112 includes information of the above described "pass-through mode."

The device information communication unit 124 communicates the device information with the HWF server 4 via the network I/F 101 using a compatible format such as MIB and job messaging format (JMF). With this configuration, the device information communication unit 415 of the HWF server 4 can acquire the device information from the DFE 100, with which information of the RIP engines 120 and information of the specific job receiving units 112 included in the DFE 100 can be set to a GUI settable and displayable on the client terminal 5.

As to the DFE 100, when the printer controller 122 controls the digital engine 150, and then the print output operation is completed, the system controller 113 recognizes the completion of the print output operation via the job controller 116. Then, the system controller 113 reports the completion of a job to the HWF server 4 via the job receiver 111. With this configuration, the job communication unit 421 of the HWF server 4 receives a report of the completion of the job.

As to the HWF server 4, the job communication unit 421 transfers the report of the completion of the job to the job controller 413, and then the job controller 413 reports the completion of the job to the workflow controller 418. The transmission of the job data from the HWF server 4 to the DFE 10 is executed by the workflow controller 418 based on a workflow information.

When the completion of the job by the DFE 100 is recognized, the workflow controller 418 controls a next process based on the workflow information. A process to be performed after performing the print output operation by the DFE 100 is, for example, a post-processing by the post processing apparatus 3.

Figure 9:
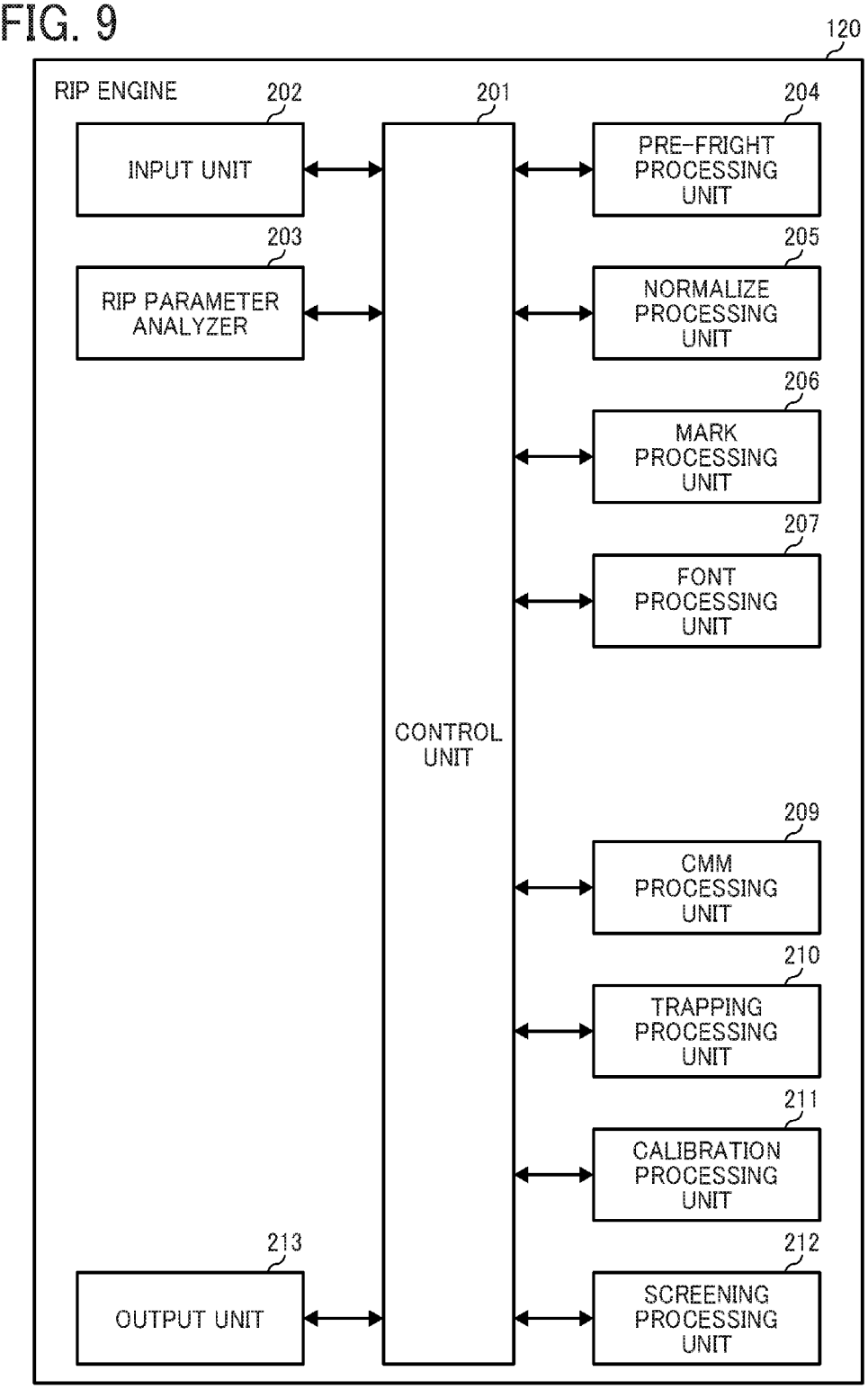
FIG. 9 is a functional configuration of a RIP engine of one or more example embodiments of the present invention.

A description is given of a functional configuration of the RIP engine of the one or more example embodiments. FIG. 9 is a functional configuration of the RIP engine 120 having the JDF analyzer 117 used for the JDF analysis process. As above described, the RIP engine 120 can be a software module that executes each of the internal processes of RIP processing to generate raster data based on the RIP parameter shown in FIG. 8. The RIP engine 120 can be, for example, an Adobe systems PDF printing engine (APPE) provided by Adobe systems, but not limited hereto.

As illustrated in FIG. 9, the RIP engine 120 is configured by a control unit 201 and other units. The other units can be employed as extended units, which can be extended by a vendor. The control unit 201 executes the RIP processing by using various capabilities that can be devised as the extended units. Specifically, as illustrated in FIG. 9, the RIP engine 120 includes the control unit 201 and the extended units such as an input unit 202, a RIP parameter analyzer 203, a pre-fright processing unit 204, a normalize processing unit 205, a mark processing unit 206, a font processing unit 207, a color management module (CMM) processing unit 209, a trapping processing unit 210, a calibration processing unit 211, a screening processing unit 212, and an output unit 213.

The input unit 202 receives information used for identifying a specific device or apparatus that includes the input unit 202 (hereinafter, "apparatus identification information"), and reports the received apparatus identification information to the control unit 201. The apparatus identification information can be acquired by the system controller 410 and the system controller 113 when the HWF system is activated. For example, the system controller 410 acquires a name of the HWF server having the RIP engine 420 as the apparatus identification information, and the system controller 113 acquires a name of the digital printer having the RIP engine 120 as the apparatus identification information. After receiving the apparatus identification information from the input unit 202, the control unit 201 stores the received apparatus identification information in the apparatus information manager 218. A process performable by the apparatus identification information will be described later in detail.

The input unit 202 receives an initialization request, and an execution request of the RIP processing, and reports the request to the control unit 201. When the initialization request is received, the above described RIP parameter is also input to the control unit 201. When the control unit 201 receives the initialization request, the control unit 201 inputs the RIP parameter, received at the same time with the initialization request, to the RIP parameter analyzer 203. Then, the control unit 201 acquires an analysis result of the RIP parameter, computed by the RIP parameter analyzer 203, and determines an activation sequence of each of the extended units included in the RIP engine 120 when the RIP processing is performed. Further, the control unit 201 determines a data format generatable by performing the RIP processing, in which the data format can be any one of the raster image, preview image, PDF, and intermediate data.

Further, when the control unit 201 receives the execution request of the RIP processing from the input unit 202, the control unit 201 activates each of the extended units included in the RIP engine 120 based on the activation sequence that is determined when the control unit 201 receives the initialization request. The pre-fright processing unit 204 checks validity of input PDL data contents. If the pre-fright processing unit 204 detects an illegal PDL attribute, the pre-fright processing unit 204 reports the illegal PDL attribute to the control unit 201. When the control unit 201 receives this report, the control unit 201 reports the illegal PDL attribute to an external module such as the RIP controller 119 and the job controller 116 via the output unit 213.

The pre-fright processing checks whether attribute information that disenables a processing by other modules included in the RIP engine 120 is included in the received data. For example, the pre-fright processing checks whether a font unable to be processed is designated or not.

The normalize processing unit 205 converts the input PDL data to PDF if the input PDL data is not PDF but PostScript. The mark processing unit 206 applies graphic information of a designated mark, and superimposes the graphic information at a designated position on a target print image.

The font processing unit 207 extracts font data, and embeds the font to PDL data, and outlines the font. The color management module (CMM) processing unit 209 converts a color space of an input image to cyan, magenta, yellow, black (CMYK) based on a color conversion table set by International Color Consortium (ICC) profile. The ICC profile includes color ICC information, and device ICC information.

The trapping processing unit 210 performs trapping processing. When different color areas are adjacent at boundaries, a gap may occur at the boundaries when a positional error occurs. The trapping processing expands each of the color areas to fill the gap.

The calibration processing unit 211 adjusts fluctuation of generated color balance, caused by aging and individual difference of an output device, to enhance precision of color conversion by the CMM processing unit 209. Further, the process by the calibration processing unit 211 can be performed outside the RIP engine 120. The screening processing unit 212 generates halftone dots in view of a final output such as printed sheet. Further, the process by the screening processing unit 212 can be performed outside the RIP engine 120 similar to the calibration processing unit 211. The output unit 213 transmits a RIP processing result to the outside. The RIP processing result is any one of raster image, preview image, PDF, and intermediate data that are determined when the initialization is performed.

Figure 10:
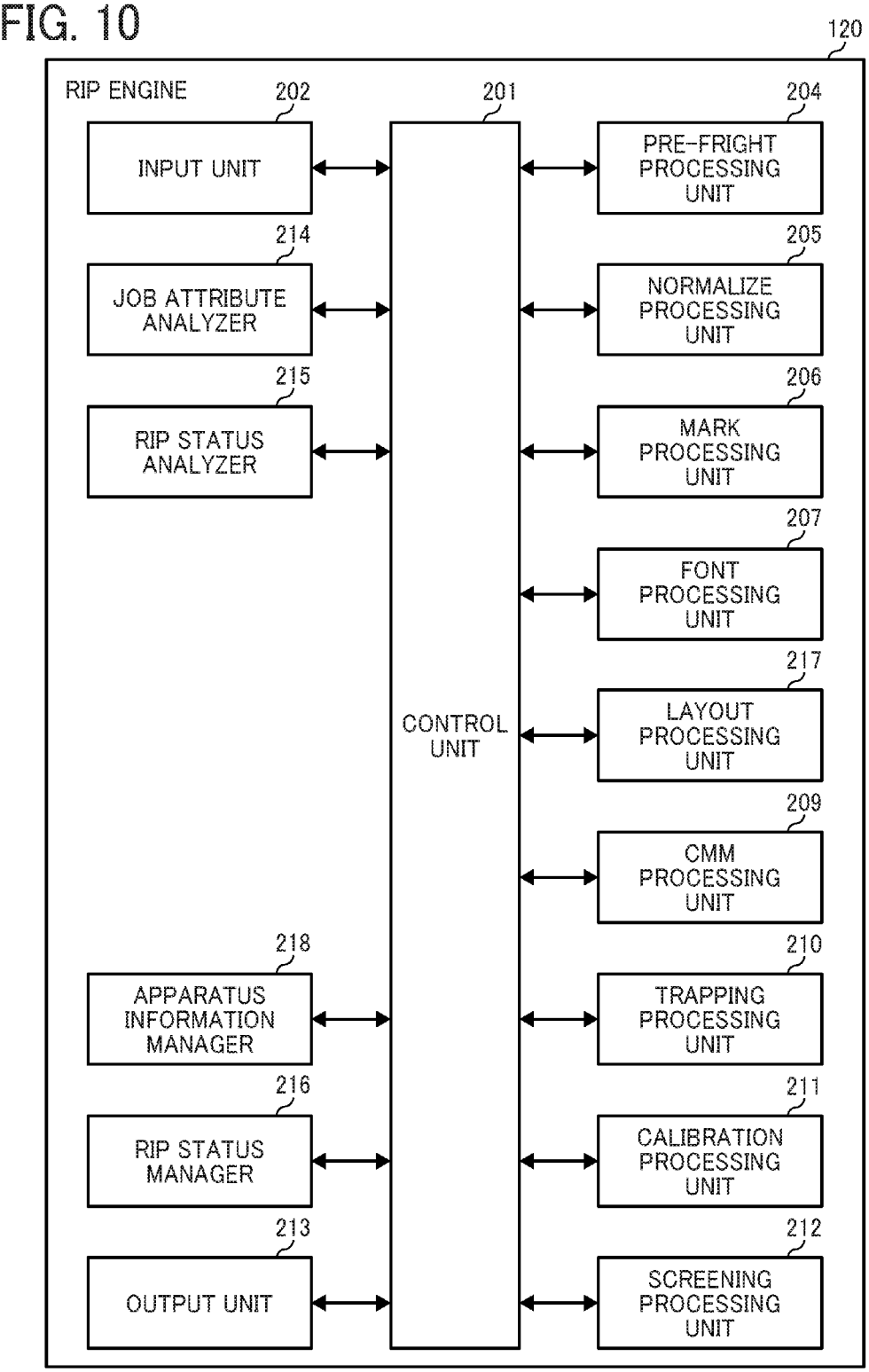
FIG. 10 is another functional configuration of a RIP engine of one or more example embodiments of the present invention.

A description is given of another functional configuration of the RIP engine 120 with reference to FIG. 10. FIG. 10 is another functional configuration of the RIP engine 120 without using JDF analysis process by the JDF analyzer 117. As above described, a case that the JDF analyzer 117 does not perform the JDF analysis process means that the internal processes of RIP processing are performed by the HWF server 4 and the DFE 100 as the distributed processing. Therefore, the HWF server 4 includes the RIP engine 420 having the same configuration of the RIP engine 120 shown in FIG. 10.

As illustrated in FIG. 10, most of the functional configuration of the RIP engine 120 not using JDF analysis process by the JDF analyzer 117 are same as the functional configuration of the RIP engine 120 of FIG. 9. Hereinafter, portions different from the configuration of FIG. 9 are described. Similar to FIG. 9, the units other than the control unit 201 can be used as the extended units. Specifically, as illustrated in FIG. 10, the RIP engine 120 includes the control unit 201 and the extended units such as the input unit 202, the pre-fright processing unit 204, the normalize processing unit 205, the mark processing unit 206, the font processing unit 207, the color management module (CMM) processing unit 209, the trapping processing unit 210, the calibration processing unit 211, the screening processing unit 212, the output unit 213, a job attribute analyzer 214, a RIP status analyzer 215, a RIP status manager 216, and a layout processing unit 217.

As to the configuration of FIG. 10, when the control unit 201 receives an initialization request from the input unit 202, the control unit 201 acquires the initialization request and the JDF information. Then, the control unit 201 analyzes the JDF information and PDL information by using the job attribute analyzer 214, and the control unit 201determines a process sequence of the extended units, and a data format to be generated as a process result of each of the extended units same as the configuration of FIG. 9.

As to the RIP engine 120 disposed in the DFE 100, data format obtained as a process result by the RIP engine 120 often becomes raster data to be input to the printer controller 122. By contrast, as to the RIP engine 420 disposed in the HWF server 4, data format obtained as a process result by the RIP engine 420 becomes different depending on patterns of the distributed processing by the HWF server 4 and the DFE 100. Therefore, the control unit 201 of the RIP engine 420 determines the data format (e.g., PDL information, intermediate data) of the process result based on an analysis result by the job attribute analyzer 214.

Further, the control unit 201 analyzes the RIP status information included in the JDF information by using the RIP status analyzer 215 to check whether one or more already-executed internal processes of RIP processing exist. If the already-executed internal process of the RIP processing unit exists, the corresponding extended unit is excluded from the target processing units of the RIP processing.

Further, the RIP status analyzer 215 can analyze the RIP status included in the JDF information, and the RIP status analyzer 215 can similarly analyze the RIP status based on PDL information. In a case of analyzing the PDL information, since the attribute information such as parameter is erased for the already-executed internal processes of RIP processing, it can determine which one of the internal processes of RIP processing is not yet performed based on the remaining attribute information.

The layout processing unit 217 performs the imposition process. Under the control of the control unit 201, the RIP status manager 216 changes the RIP status corresponding to each of the internal processes of RIP processing already performed by each of the extended units to "Done". The output unit 213 transmits a RIP result to outside the RIP engine. The RIP result is data having the data format that is determined when the initialization is performed.

Further, as described above, the plurality of the RIP engines 120 disposed in the DFE 100 such as "DFE (engine A)" and "DFE (engine B)" can be selectively used depending on information of the "RIP device designation" included in the JDF information. Since the control unit 201 cannot consign the processing to the extended units of other RIP engine, the job controller 116 can be used to consign the processing.

As described above, the job controller 116 adds the "RIP engine identification information" to the RIP parameter. In this case, the job controller 116 generates different RIP parameters for each of the different internal processes of RIP processing designated with different RIP engines. In an example case of FIG. 3, the RIP parameter of "engine A" is generated or designated for executing the "font" and "layout," the RIP parameter of "engine B" is generated or designated for executing the "mark," and the RIP parameter of "engine A" is generated or designated for the subsequent processes after the "mark" as shown in FIG. 3.

Then, the job controller 116 requests the RIP unit 118 to perform the RIP processing based on each of the generated RIP parameters with a process sequence set for each of the internal processes of RIP processing. With this configuration, each of the internal processes of RIP processing can be performed by selectively using the different RIP engines such as "engine A" and "engine B."

In this process, each of the engines can perform only the designated process by referring the "RIP status" information. Specifically, by setting the status of to-be-processed items as "NotYet" and the status of other items as "Done," only the designated process can be performed.

Figure 11:
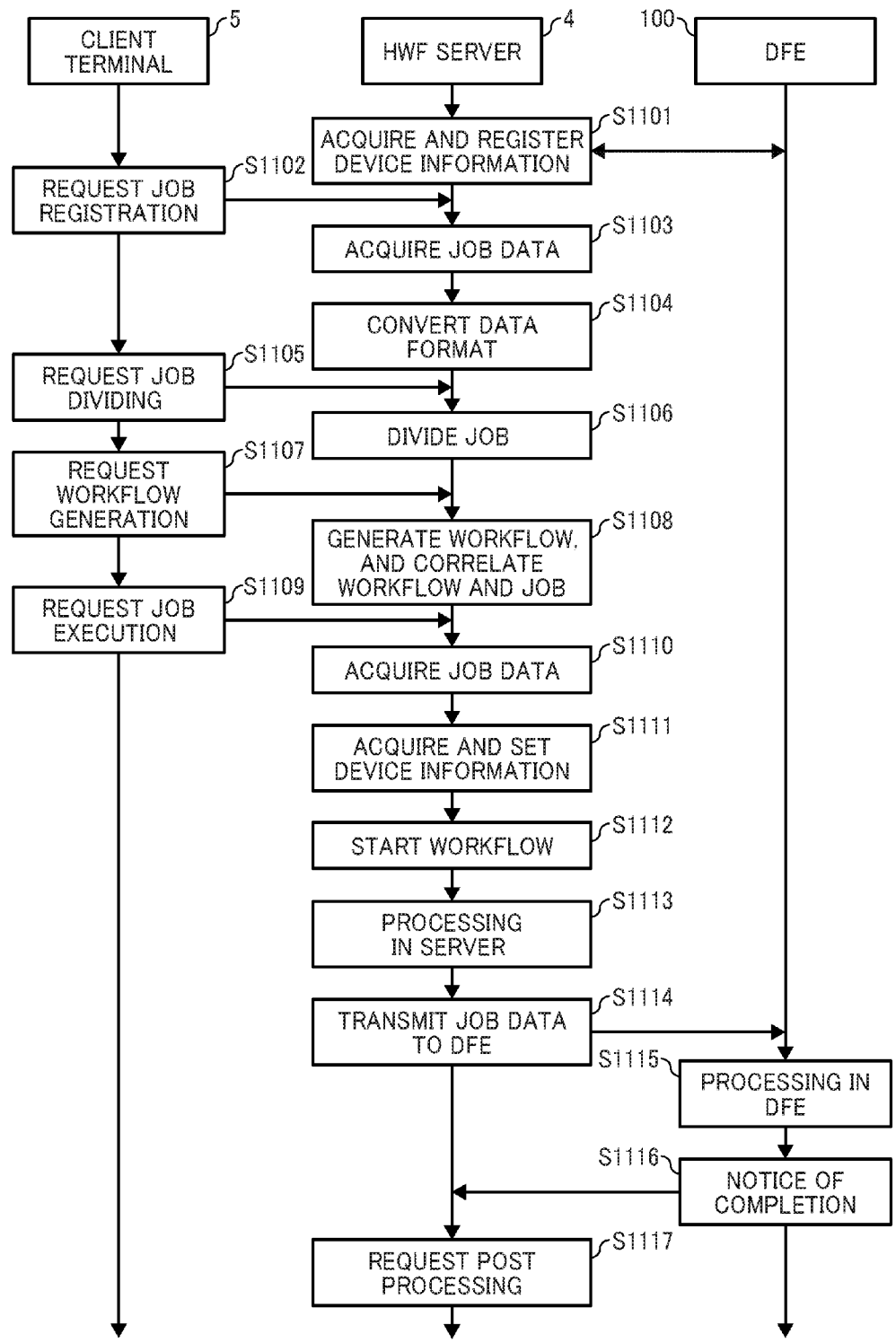
FIG. 11 is a sequential chart for an operation flow of a HWF system of one or more example embodiments of the present invention.

A description is given of an operation of the HWF system of the one or more example embodiments with reference to FIG. 11. FIG. 11 is a sequential chart of an operation flow of the HWF system. FIG. 11 is an example of a sequential chart when the digital printer 1 executes a print output operation. As illustrated in FIG. 11, the device information communication unit 415 of the HWF server 4 acquires device information from the DFE 100 and the CTP 200 via a network, and the device information manager 416 registers the device information in the device information storage 417 (S1101). The process of S1101 can be performed at regular intervals.

When a registration of job data is performed by an operation of an operator to a GUI of the HWF system, the client terminal 5 transmits a job registration request to the HWF server 4 (S1102), in which the UI controller 412 of the HWF server 4 acquires the job registration request. With this configuration, the data receiver 411 acquires job data under the control of the system controller 410 (S1103).

When the data receiver 411 acquires the job data, the system controller 410 controls the job controller 413 to convert a format of the acquired job data to PDL format (S1104), and the format-converted job data is registered in the job data storage 414. As to the GUI that the registration of job data is performed at S1102, an interface such as a file path for designating a registration target data, and an input section for designating each of information items in the JDF information (FIG. 3) can be displayed.

Further, by performing the process at step S1101, the HWF server 4 can acquire information of the type of the RIP engine disposed in the DFE 100. Therefore, the information of the "RIP device designation" (FIG. 3) can be selectively input to the input section on the GUI of the client terminal 5, in which when the DFE 100 is to perform the processing, a specific RIP engine to perform the concerned processing can be selected.

Further, when a process of dividing the job data is performed in response to an operation of the operator to the GUI of the HWF system, the client terminal 5 transmits a job dividing request to the HWF server 4 (S1105). FIG. 12 is an example of information includable in the job dividing request transmitted at S1105. As illustrated in FIG. 12, information indicating a dividing target job and information indicating dividing contents are transmitted as the job dividing request. In this example case, the information indicating dividing contents is specifically correlated with a device to execute a print output operation of each of the dividing contents. In an example case of FIG. 12, one device is correlated for executing a print output operation of some pages, and another device is correlated for executing a print output operation of other pages, in which the devices are correlated with the unit of "page."

When the HWF server 4 receives the job dividing request, the system controller 410 divides the dividing target job (i.e., job data) page-by-page based on the information indicating the dividing contents (FIG. 12) to generate a plurality of sub-job data configuring the dividing target job (S1106). In this process, the device designated for each of the divided area can be used as information of "device designation" in the JDF information (FIG. 3). When the job data is divided to generate the plurality of the sub-job data, each of the sub job data is stored in the job data storage 414 as a discrete job.

Further, when a process of generating a workflow is performed in response to an operation of the operator to the GUI of the HWF system, the client terminal 5 transmits a workflow generation request to the HWF server 4 (S1107). When the workflow generation request is transmitted, information designating the workflow contents and information identifying one or more jobs to be processed in line with the workflow (FIG. 5) are transmitted.

When the HWF server 4 receives the workflow generation request, the system controller 410 inputs the information received with the workflow generation request to the workflow controller 418. With this configuration, the workflow controller 418 generates a new workflow information based on the received information, and stores the new workflow information in the workflow information storage 419, and correlates the new workflow information and the job identified by the workflow generation request (S1108). The workflow and the job can be correlated by adding, for example, an identifier identifying the workflow to the JDF information.

When the job execution operation is performed in response to an operation of an operator to the GUI on the client terminal 5 after S1108, the client terminal 5 transmits a job execution request to the HWF server 4 (S1109). Further, steps S1102, S1105, S1107, and S1109 can be performed as different processes, or steps S1102, S1105, S1107, and S1109 can be performed as one-time process for performing the job registration request, job dividing request, workflow generation request, and job execution request at one time.

When the HWF server 4 receives the job execution request, the system controller 410 acquires the designated job data from the job data storage 414 based on information for identifying the job data received with the job execution request (S1110). Further, the system controller 410 acquires the latest information of the device designated in the acquired job data from the device information manager 416, and sets the acquired latest device information to the job (S1111).

Then, the system controller 410 transfers the job data to the workflow controller 418 to start an execution of the workflow (S1112). The workflow controller 418 acquires the workflow information correlated to the acquired job data from the workflow information storage 419, and executes the processes in line with the workflow information.

As to the workflow processing, the processing in the server to be performed by the RIP engine 420 disposed in the HWF server 4 is executed at first (S1113). At S1113, under the control of the workflow controller 418, the job controller 413 controls the RIP engine 420 to execute the processes as described above.

When the workflow processing proceeds to a stage to transfer the workflow processing to the DFE 100, under the control of the workflow controller 418, the job controller 413 controls the job communication unit 421 to transmit the job data to the DFE 100 (S1114). At S1114, the job controller 413 designates a specific job receiving unit 112 from the plurality of specific job receiving units 112 based on information designated in the JDF information.

When the job data is transmitted to the DFE 100, any one of the plurality of specific job receiving units 112 is designated, with which the specific job receiving unit 112 matched to the job data receives the job data in the DFE 100. When the job data is input into the DFE 100, the RIP processing and the output processing by the digital engine 150 are performed in the DFE 100 as described above (S1115).

When the DFE 100 completes the designated processes, the job receiver 111 reports the completion notice of the processes to the HWF server 4 (S1116). When the job controller 413 receives the completion notice of the processes from the DFE 100 via the job communication unit 421, the job controller 413 reports the completion notice of the processes to the workflow controller 418. Then, the workflow controller 418 transmits a post processing request to the post processing apparatus 3 to execute a post-processing designated in the workflow executable after the processing at the DFE 100 (S1117).

At S1117, under the control of the workflow controller 418, the job controller 413 controls the job communication unit 421 to transmit the post processing request to the post-processing apparatus 3. By performing the above described processing, the operation of the HWF system completes.

A description is given of a detail of the internal processing of the DFE 100 at S1115 in FIG. 11 with reference to FIG. 13, which is a flow chart showing the steps of the processing in the DFE 100. A shown in FIG. 13, when the HWF server 4 transmit the job data to the DFE 100, the designated specific job receiving unit 112 receives the job data (S1301). After receiving the job data, the specific job receiving unit 112 updates the JDF information to apply the discrete setting, set to the specific job receiving unit 112, to the job data (S1302).

The above described "pass-through mode" can be also applied at S1302. The job data applied with the discrete setting is input to the system controller 113, and then the system controller 113 stores the input job data in the job data storage 114 depending on the discrete setting, and performs a preview processing via the UI controller 115 depending on an operation of an operator.

The system controller 113 inputs the job data to the job controller 116 when the job execution timing comes at the DFE 100. For example, the system controller 113 inputs the job data to the job controller 116 when the job execution of the DFE 100 is requested by an operation of the operator, or when a timer counts the execution time set in advance. Then, the job controller 116 checks whether the pass-through mode is set by referring the input job data (S1303). If the result is not the pass-through mode (S1303: NO), the job controller 116 outputs the job data to the JDF analyzer 117 to generate the job attribute in DFE (S1304).

If the result is the pass-through mode (S1303: YES) or the job attribute in DFE is generated by performing the JDF conversion (S1304), the job controller 116 generates the RIP parameter (S1305). If the result is not the pass-through mode (S1303: NO), the RIP parameter shown in FIG. 8 is generated at S1305. By contrast, if the result is the pass-through mode (S1303: YES), the RIP parameter is generated for information other than "input/output image information" (FIG. 8), and the JDF information is referred for the "input/output image information."

When the job controller 116 generates the RIP parameter, the job controller 116 inputs required information to the RIP unit 118 to execute the RIP processing (S1306). With this configuration, the raster data can be generated by the RIP engine 120.

At S1305, as described above, based on information of the "RIP device designation" shown in FIG. 3, the RIP parameter is generated for each of the RIP engines. At S1306, the RIP processing is executed for each of the generated RIP parameter with a given process sequence to generate the raster data.

When the raster data is generated, and the job controller 116 acquires the raster data from the RIP unit 118, the job controller 116 inputs the raster data to the printer controller 122 to execute a print output operation by the digital engine 150 (S1307). With this processing configuration, the internal processing of the DFE 100 is completed.

Figure 14:
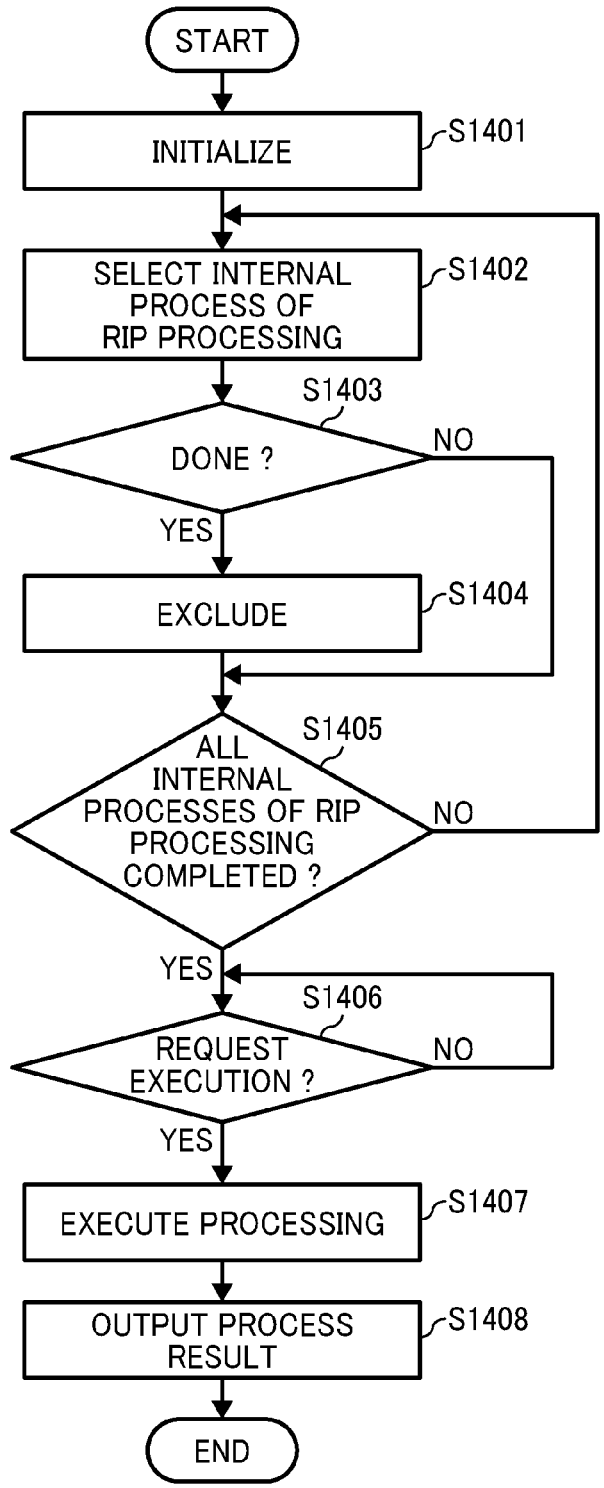
FIG. 14 is flow chart showing the steps of RIP processing of one or more example embodiments of the present invention.

A description is given of a detail of the RIP processing at S1306 of FIG. 13 with reference to FIG. 14. As shown in FIG. 14, based on the initialization request input to the input unit 202, the control unit 201 performs an initialization process (S1401). In an example case of FIG. 9, at S1401, the RIP parameter analyzer 203 receives and analyzes the RIP parameter, and determines one or more extended units to be used for executing one or more processes among the extended units included in the RIP engine 120, and a process sequence of processing of the extended units as described above. Further, the RIP parameter analyzer 203 determines a data format of data to be generated as a process result when the processing is performed.

Further, in another example case of FIG. 10, the job attribute analyzer 214 receives and analyzes JDF information and PDL information to determine one or more extended units to be used for executing one or more processes among the extended units included in the RIP engine 120, and a process sequence of processing of the extended units. Further, the job attribute analyzer 214 determines a data format of data to be generated as a process result when the processing is performed. Then, in another example case of FIG. 10, the control unit 201 instructs the RIP status analyzer 215 to execute the status analysis.

As to the RIP status analysis, the RIP status analyzer 215 refers or checks the "RIP status" (FIG. 3), and selects one item of the internal processes of RIP processing (S1402). If the status of the selected item is "Done" (S1403: YES), the corresponding extended unit is excluded from the extended units determined as the execution targets at S1401 (S1404). If the status of the selected item is "NotYet" (S1403: NO), the sequence proceeds to S1405.

The RIP status analyzer 215 repeats steps from S1402 to S1405 until all of the items of the internal processes of RIP processing are processed (S1405). When the RIP status analyzer 215 completes steps from S1402 to S1405 for all of the items of the internal processes of RIP processing (S1405: YES), and the input unit 202 acquires an execution request of the RIP processing (S1406: YES), the control unit 201 controls each of the extended units to execute the RIP processing with a given process sequence (S1407).

The RIP status analyzer 215 repeats steps from S1402 to S1405 until all of the items of the internal processes of RIP processing is processed (S1405). When the RIP status analyzer 215 completes steps from S1402 to S1405 for all of the items of the internal processes of RIP processing (S1405: YES), and the input unit 202 acquires an execution request of the RIP processing (S1406: YES), the control unit 201 controls each of the extended units to execute the RIP processing with a given process sequence (S1407).

At S1407, the RIP processing is requested to one or more extended units determined at step S1401 and not excluded by the process at step S1404. Further, the RIP processing is requested to perform in line with the process sequence determined at step S1401. When the one or more extended units perform the RIP processing and the raster data is generated, the output unit 213 outputs a process result (S1408). With this processing configuration, the RIP processing by the RIP unit 118 completes.

In another example case of FIG. 10, steps S1402 to S1405 (i.e., status analysis) is performed only for the RIP engine 120 compatible to the pass-through mode because the RIP status analysis is required when the RIP processing is divided or assigned between the HWF server 4 and the DFE 100 as described above.

Since the RIP engine disposed in the HWF server 4 and the RIP engine disposed in the DFE 100 use the RIP engine having the same capability, the RIP processing can be performed as one processing without recognizing a boundary of the HWF server 4 and the DFE 100. Therefore, it is preferable to input data processed by the RIP engine 420 of the HWF server 4 to the RIP engine 120 of the DFE 100 as they are, in which the pass-through mode is suitable for the RIP processing because the JDF analyzer 117 disposed outside of the RIP engine 120 is not used.

However, this is just one example. Even if the pass-through mode is not used, the RIP status analysis is required when the RIP processing is divided or assigned between the HWF server 4 and the DFE 100. Specifically, when the RIP processing is divided or assigned between the HWF server 4 and the DFE 100, the RIP processing already executed at the HWF server 4 is required to be excluded from the RIP processing when the RIP processing is executed at the DFE 100.

Therefore, even if the RIP engine 120 is not compatible to the pass-through mode, the RIP status analyzer 215 can be disposed to divide or assign the RIP processing between the HWF server 4 and the DFE 100. Specifically, when the RIP processing is divided or assigned between the HWF server 4 and the DFE 100, the JDF analysis can be performed by the JDF analyzer 117 at the DFE 100, and then the RIP status analysis can be performed by the RIP status analyzer 215 to determine which internal process of RIP processing is required to be processed.

Figure 15:
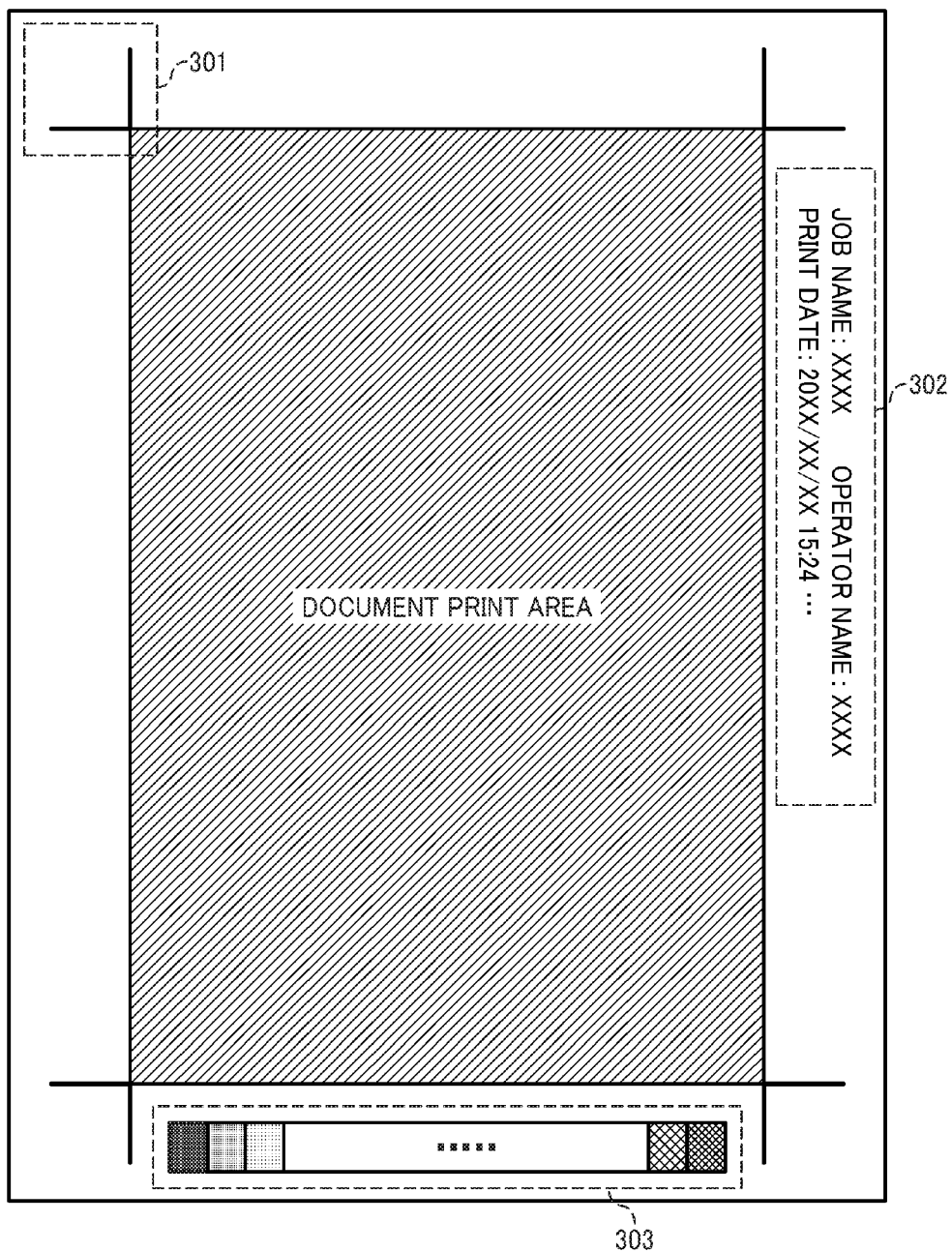
FIG. 15 illustrates an example of a recording medium set with one or more marks of one or more example embodiments of the present invention.

A description is given of the mark processing according to one or more example embodiments in detail. FIG. 15 illustrates an example of a recording medium such as a sheet set with one or more marks. The recording medium can be paper sheet, film sheet, plastic sheet or the like, which can be used as the recording medium to form an image by performing an image forming operation. In this description, a paper sheet is used as one example of the recording medium.

The mark is an image data printable on a given area or portion of a sheet. For example, as illustrated in FIG. 15, target image data is printed on a hatched area (hereinafter, "document print area") of the sheet, and the mark is printed on the given area on the sheet, which is outside the "document print area." The given area is, for example, a bleed area to be cut by a trimmer, and thereby a printed product does not include the bleed area when the printed product is finally prepared.

As illustrated in FIG. 15, the mark printed in the bleed area includes, for example, a crop mark 301, a text mark 302, and a color bar 303. The crop mark 301 is printed at each of four corners of the sheet as a mark to indicate a cutting position of the sheet, with which the sheet can be cut to generate a printed product with a finishing size.

The text mark 302 includes various text information related to a plurality of processes in the HWF system such as a job name indicating a name of job data, an operator name indicating a name of an operator operating the system, and date when a print output operation is executed. The color bar 303 is used as information to check color tone. The marks indicated in FIG. 15 are encircled by dot lines for clarifying positions of the marks, but the dot lines may not be printed on the sheet when a print output operation is performed.

The text information configuring the text mark 302 may become different depending on whether information is acquired by or through the HWF server 4 or the DFE 100. For example, an operator of the HWF server 4 that inputs job data to the HWF server 4, and an operator of the DFE 100 that executes and edits the job data transmitted from the HWF server 4 may be typically different persons. If the operator of the HWF server 4 and the operator of the DFE 100 are different persons, the operator name included in the text mark 302 becomes different when the operator name is acquired by or through the HWF server 4 or the DFE 100.

Further, for example, the printed date included in the text mark 302 can be a date when job data is input to the HWF server 4. However, after the job data is transmitted from the HWF server 4 to the DFE 100, the DFE 100 may not execute the processing of the job data immediately but starts to execute the processing of the job data at a time point elapsed from the receiving time of the job data from the HWF server 4. In this case, the date when the print output operation is actually performed becomes different from the date when the job data is input to the HWF server 4. Therefore, the printed date included in the text mark 302 becomes different depending on whether the date is acquired by or through the HWF server 4 or the DFE 100.

By contrast, the job name included in the text mark 302 remains the same from the time point when the job data is input to the HWF server 4 to the time point when the DFE 100 completes the print output operation. Therefore, the job name included in the text mark 302 becomes the same name when the job name is acquired by any one of the HWF server 4 and the DFE 100.

As above described, some information (e.g., operator name, output date) may become different depending on whether the information is acquired by or through the HWF server 4 or the DFE 100, and thereby the text mark may not include required information in some cases. Further, when some information can be acquired by or through only one of the HWF server 4 and the DFE 100, and the mark processing is executed at one device or apparatus, required information acquired at other device or apparatus may not be included in the text mark on a printed product after processing the mark processing in some cases. For example, information that can be acquired by or through only one of the HWF server 4 and the DFE 100 is sheet information indicating types of the sheet, which can be selected at a time point when the DFE 100 starts a printing operation.

As above described, some of the text information configuring the text mark may be acquired from different information sources by or through the HWF server 4 and the DFE 100. As to the one or more example embodiments of the present invention, the mark processing can be executed at any one of the HWF server 4 and the DFE100 in view of contents of the text information configuring the text mark. FIG. 16 is an example of JDF information used for executing the mark processing at any one of the HWF server 4 and the DFE100 in view of contents of the text information.

As shown in FIG. 16, the JDF information includes, for example, "mark information" and "changeable mark information." Further, the "mark information" incudes, for example, "mark data file," "mark designation page information," "mark position information," "mark size information," "mark orientation information," and "mark type information (or mark identification information)." The "mark data file" is list information to acquire image data of the set mark, in which mark type information for identifying marks and information of storage area storing image data of marks are correlated for each of the marks.

The "mark designation page information" is list information that designates each of pages where each of the marks is added. The "mark position information" is list information that designates position information on each of pages where each of the marks is added. The "mark size information" is list information that designates size information of each of the marks. The "mark orientation information" is list information that designates an orientation of each of the marks. The "mark type information (or mark identification information)" is list information that designates a type of each of the marks. For example, the "mark type information" designates whether a mark is the crop mark or the text mark.

Among the text mark information designated in the "mark information," the "changeable mark information" is the text mark information configured by text information acquired from the different information sources by or through the HWF server 4 and the DFE 100 as above described. The "changeable mark information" designates text information and a position of text information to be processed by the mark processing at any of the HWF server 4 and the DFE 100.

As shown in FIG. 16, the "changeable mark information" includes, for example, information of "HWF changeable mark" and "DFE changeable mark." The "HWF changeable mark" designates text information acquired by or through the HWF server 4 and then processed by the mark processing. The "DFE changeable mark" designates text information acquired by or through the DFE 100 and then processed by the mark processing. Hereinafter, any text information designated in the "changeable mark information" is referred to "changeable text information." The "HWF changeable mark" and "DFE changeable mark" can be designated for each of changeable text information as required.

The "HWF changeable mark" includes, for example, "position information" and "item information," and the "DFE changeable mark" includes, for example, "position information" and "item information." The "position information" indicates a position of changeable text information, processable by the mark processing, on a sheet to be printed with an image thereon. The "item information" is a name for identifying contents indicated by the changeable text information. For example, as to the JDF information shown in FIG. 16, it is designated that the changeable text information indicating a "device name" is to be processed by the mark processing at the HWF server 4 to set the "device name" on the left end of the first line in the right margin area of a sheet, and the changeable text information indicating an "output date" is to be processed by the mark processing at the HWF server 4 to set the "output date" on the center of the first line in the right margin area of the sheet.

The JDF information shown in FIG. 16 can be generated, for example, by an operator. Specifically, when the operator of the HWF server 4 operates a graphical user interface (GUI) displayed on the client terminal 5 to allocate the mark processing of each of the changeable text information to any one of the HWF server 4 and the DFE 100, the JDF information shown in FIG. 16 can be generated.

Further, the JDF information shown in FIG. 16 can be generated by the HWF server 4. Specifically, when an allocation of the mark processing of each of the changeable text information to any one of the HWF server 4 and the DFE 100 is executed at the HWF server 4, the JDF information shown in FIG. 16 can be generated, in which the operator of the HWF server 4 designates only text information to be processed by the mark processing, and then the mark processing of each of the changeable text information is allocated to each of the devices such as the DFE 100 and HWF server 4 by the processing at the HWF server 4.

Figure 17:
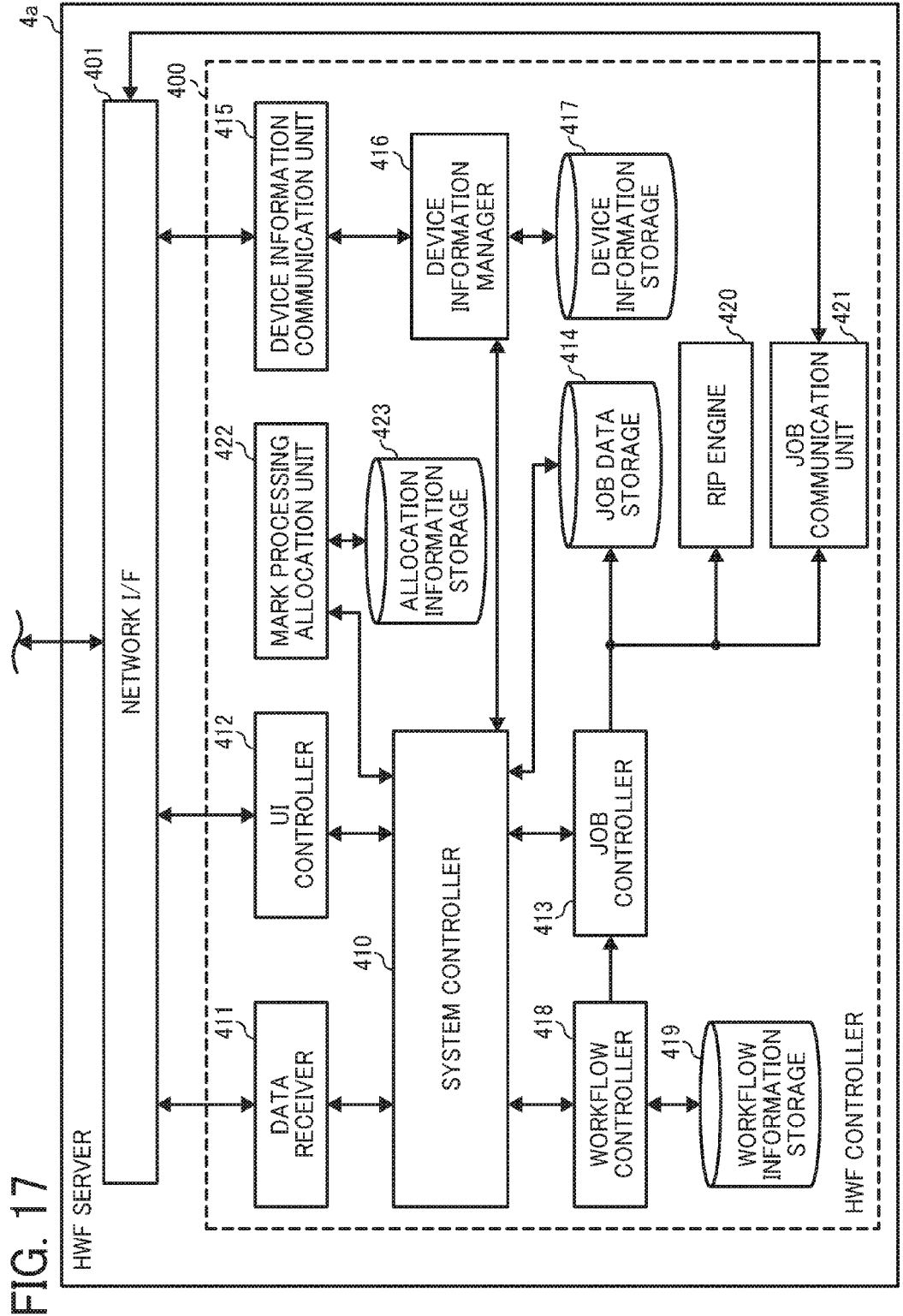
FIG. 17 is a functional configuration of another HWF server of one or more example embodiments of the present invention.

A description is given of another functional configuration of the HWF server 4 with reference to FIG. 17. FIG. 17 is a functional configuration of a HWF server 4a, which can be used to allocate the mark processing of the changeable text information to the HWF server and the DFE. As illustrated in FIG. 17, the HWF server 4a is configured by adding a mark processing allocation unit 422, and an allocation information storage 423 to the HWF server 4 illustrated in FIG. 4. Therefore, the HWF server 4a is described for the configuration different from the configuration of FIG. 4, and the same configuration is not described.

The mark processing allocation unit 422 allocates the mark processing of each of the changeable text information to any one of the HWF server 4 and the DFE 100 based on the JDF information included in the input job data, and allocation information stored in the allocation information storage 423. Then, the mark processing allocation unit 422 updates the JDF information based on an allocation result. The mark processing allocation unit 422 can be used as a process allocator that allocates one or more of text information adding processes (e.g., mark processing) of given text information (e.g., changeable text information) to any one of the HWF server 4 and the DFE 100 for each of adding text information.

Figure 18:
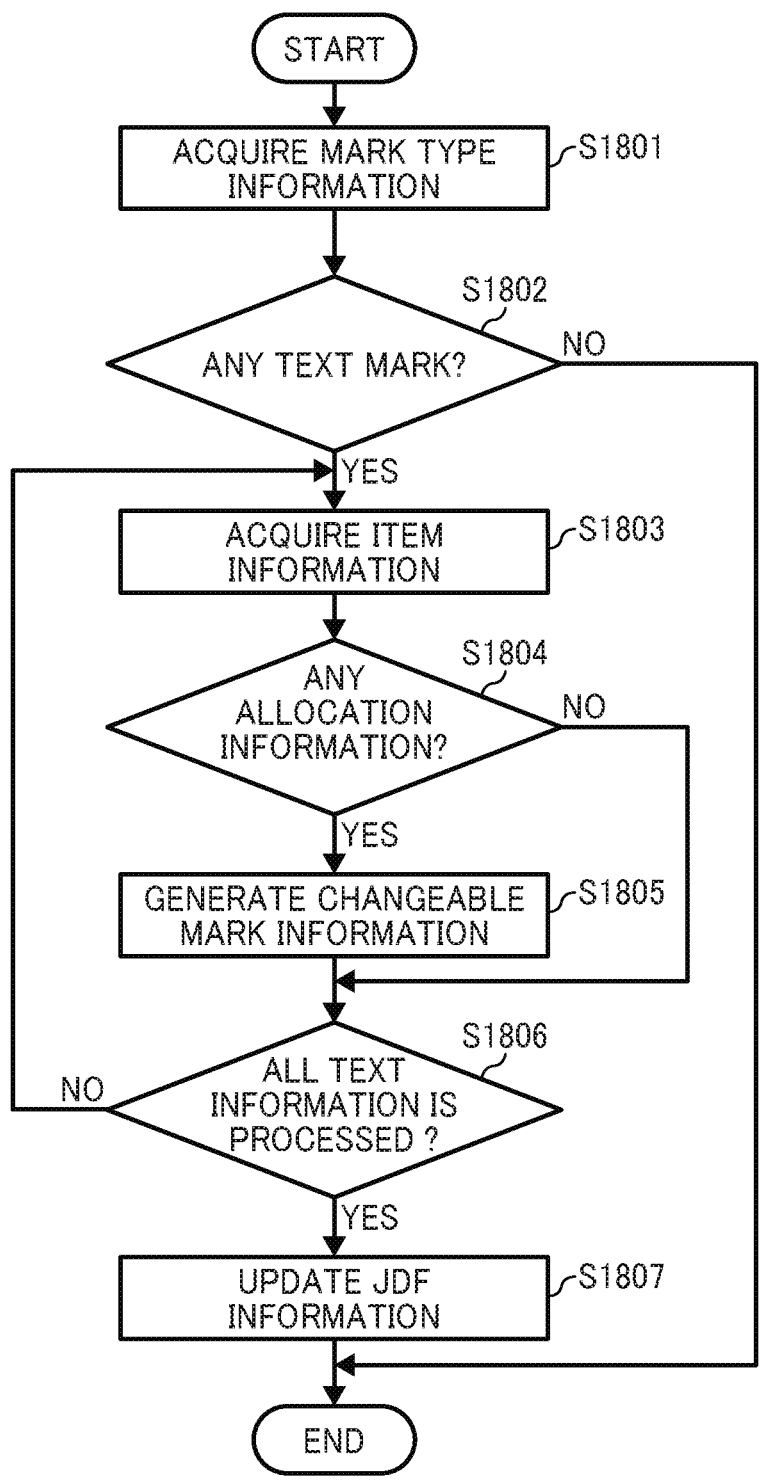
FIG. 18 is a flowchart showing the steps of a process of allocating mark processing by a mark processing allocation unit of one or more example embodiments of the present invention.

FIG. 18 is a flowchart showing the steps of a process of allocating the mark processing by the mark processing allocation unit 422. As shown in FIG. 18, the mark processing allocation unit 422 acquires the mark type information designated by "mark type information" (or mark identification information)" of the "mark information" included in the JDF information (S1801). After acquiring the mark type information, the mark processing allocation unit 422 determines whether mark information of "text mark" is designated for the acquired mark type information (S1802).

If the mark information of the "text mark" is not designated (S1802: NO), the mark processing allocation unit 422 does not have changeable text information to be allocated to the HWF server 4 and the DFE 100 for the mark processing, and then the sequence is completed without performing the allocation processing. By contrast, if the mark information of the "text mark" is designated (S1802: YES), the mark processing allocation unit 422 acquires item information indicating contents of text information configuring the mark information of the "text mark" from the acquired mark type information (S1803). The item information of the text information includes, for example, an "operator name" indicating a name of the operator (i.e., information of operator), and an "output date" indicating a date when a recording medium is output.

After acquiring the item information (S1803), the mark processing allocation unit 422 determines whether allocation information stored in the allocation information storage 423 includes the acquired item information (S1804). FIG. 19 is an example of the allocation information stored in the allocation information storage 423. As shown in FIG. 19, the allocation information can be prepared as a table, which is generated in advance by correlating the "item information," "device," and "changeable mark item information."

The "item information" indicates the contents of the changeable text information as above described. The "device" indicates a device name to be used for performing the mark processing to the changeable text information of the "item information." The "changeable mark item information" indicates the item information of the changeable text information allocated to each of the devices and to be processed by the mark processing. As to the allocation information of FIG. 19, for example, it is designated that changeable text information correlated to the "device name" of the "item information" is acquired by or through both of the "HWF server 4" and the "DFE100," and each one of the changeable text information is processed by the mark processing by each of the "HWF server 4" and the "DFE 100," and the item information processed by the mark processing at each of the "HWF server 4" and the "DFE 100" are set as the "device name."

Further, as to the allocation information of FIG. 19, for example, it is designated that the changeable text information correlated to the "output date" of the "item information" is acquired by or through both of the "HWF server 4" and the "DFE 100," and each of the changeable text information is processed by the mark processing by each of the "HWF server 4" and the "DFE 100." Then, it is designated that the item information processed by the mark processing at the HWF server 4 is set as the "output date." The changeable text information of the "output date" processed by the mark processing at the HWF server 4 indicates, for example, a date when the job data is output to the DFE 100.

Further, the "output date" of the "item information" processed by the mark processing at the DFE 100 can be designated as "printed date" and "reprinted date." For example, the changeable text information of the "printed date" processed by the mark processing at the DFE 100 indicates a date when a print output operation is executed by the DFE 100, and the changeable text information of the "re-printed date" processed by the mark processing at the DFE 100 indicates a date when a re-print output operation is executed by the DFE 100. The changeable text information of the "re-printed date" is processed by the mark processing only when the re-print output operation is executed.

Further, as to the allocation information of FIG. 19, for example, it is designated that the changeable text information correlated to the "sheet information" of the "item information" is acquired by or through the "DFE 100," and the item information processed by the mark processing at the DFE 100 is set as "sheet information." Further, as to the allocation information of FIG. 19, the "page number" is text information to be added to each of sheets when the print output operation is executed. For example, when a page sequence to be printed by the DFE 100 is changed, text information of the "page number" acquired by or through the HWF server 4 and text information of the "page number" acquired by or through the DFE 100 may become different, which means that the "output date," "sheet information," and "page number" become different depending on operational conditions of each of the HWF server 4 and the DFE 100.

A description is returned to the flowchart of FIG. 18. If any one of the "item information" in the allocation information of FIG. 19 matches the item information acquired at step S1803 (S1804: YES), the mark processing allocation unit 422 generates changeable mark information designated in the JDF information (S1805). Specifically, when the "device" correlated to the acquired item information is "HWF" in the allocation information, the mark processing allocation unit 422 generates changeable mark information as "HWF changeable mark" as shown in FIG. 16. By contrast, when the "device" correlated to the acquired item information is "DFE" in the allocation information, the mark processing allocation unit 422 generates changeable mark information as "DFE changeable mark" as shown in FIG. 16.

Further, the mark processing allocation unit 422 designates information of the "changeable mark item information" of the allocation information as the "item information" of "HWF changeable mark" (or "DFE changeable mark") shown in FIG. 16. Further, the mark processing allocation unit 422 designates "position information" of the "HWF changeable mark" (or "DFE changeable mark") shown in FIG. 16 based on a position designated by the "mark position information" of the "mark information."

When the changeable mark information is generated, the mark processing allocation unit 422 determines whether the mark processing is completed for all of the text information configuring the mark information identified as the "text mark." (S1806). By contrast, if the item information acquired at step S1803 is not included in the "item information" of the allocation information (S1804: NO), the mark processing allocation unit 422 proceeds the sequence to step S1806 without generating changeable mark information.

If the mark processing allocation unit 422 determines that the mark processing is completed for all of the text information (S1806: YES), the mark processing allocation unit 422 updates the JDF information based on the generated changeable mark information (S1807). Specifically, the mark processing allocation unit 422 adds the changeable mark information generated for each of the text information to the JDF information. Further, the mark processing allocation unit 422 updates the JDF information by deleting information related to the mark information generated as the changeable mark information among the "mark information" of the JDF information.

By contrast, if the mark processing allocation unit 422 determines that the mark processing is not completed for all of the text information (S1806: NO), the mark processing allocation unit 422 acquires the item information of not-yet processed text information (S1803), and repeats the sequence from S1803.

By performing the sequence shown in FIG. 18, the mark processing allocation unit 422 allocates the mark processing of the changeable text information included in text information configuring the text mark to the HWF server 4 and the DFE 100, and the mark processing allocation unit 422 adds the "changeable mark information" shown in FIG. 16 to the JDF information as an allocation result. Further, information related to the mark information added as the "changeable mark information" among "the mark information" is deleted.

Figure 20:
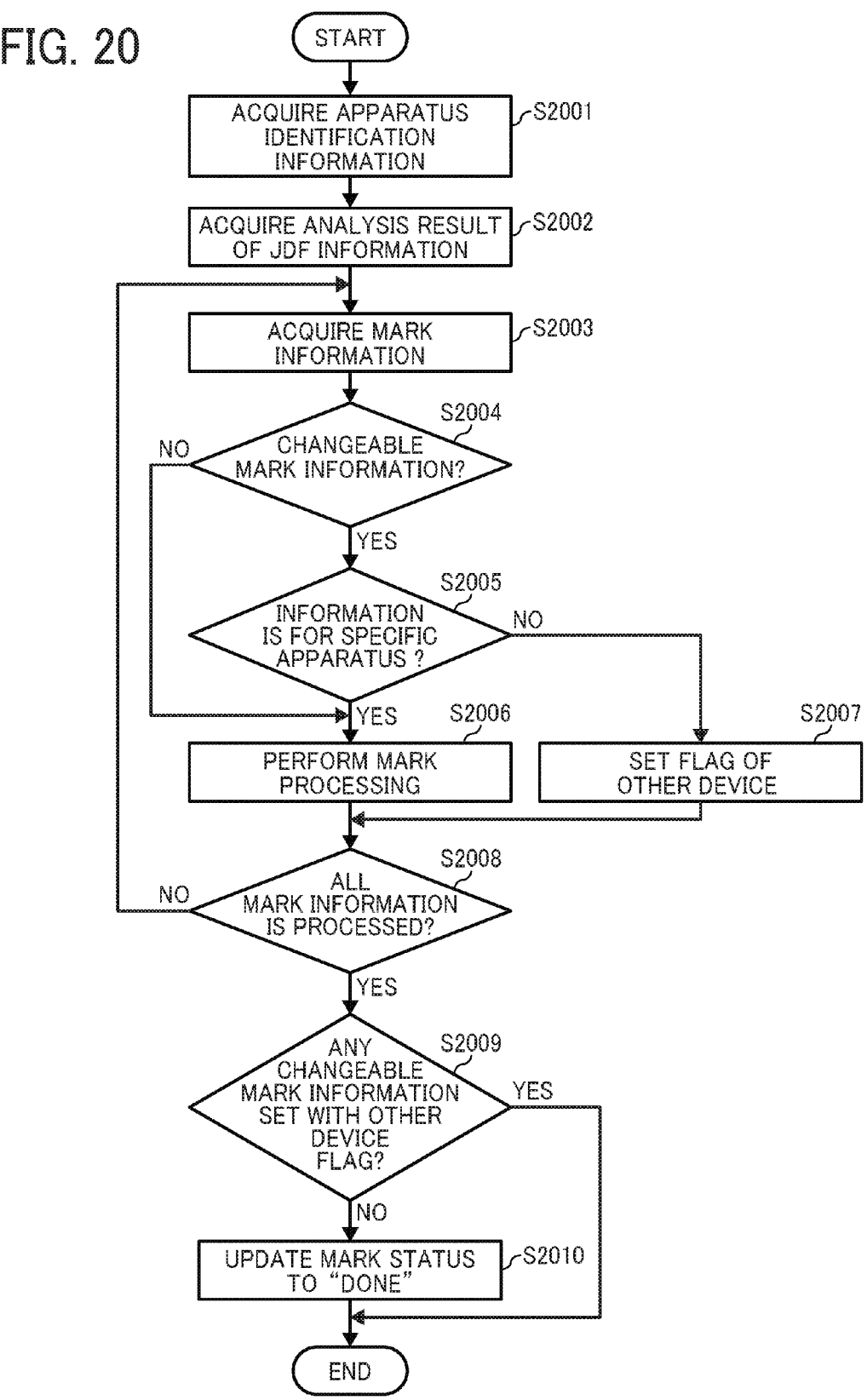
FIG. 20 is a flowchart showing the steps of mark processing by a mark processing unit of one or more example embodiments of the present invention.

A description is given of the mark processing by the mark processing unit 206 of the RIP engine 120 shown in FIG. 10 with reference to FIG. 20. FIG. 20 is a flowchart showing the steps of the mark processing by the mark processing unit 206 of the RIP engine 120 compatible to the "pass-through mode." Since the RIP engine 120 of the DFE 100 and the RIP engine 420 of the HWF server 4 employ the same configuration as described above, the flowchart of FIG. 20 can be also applied to the RIP engine 420.

As shown in FIG. 20, the mark processing unit 206 acquires the apparatus identification information stored in the apparatus information manager 218 via the control unit 201 (S2001). After acquiring the apparatus identification information, the mark processing unit 206 acquires the RIP parameter as an analysis result of the JDF information (S2002).

FIG. 21 is an example of the RIP parameter acquired at step S2002. The RIP parameter shown in FIG. 21 includes "non-changeable mark information." The "non-changeable mark information" is mark information, which is not the changeable mark information. Specifically, the "non-changeable mark information" includes, for example, the mark information such as the crop mark and color bar other than the text mark, and text information such as a job name that remains the same for any devices.

The "mark data" in the "non-changeable mark information" is a list of image data and position information of the mark information other than the changeable mark information. The information of "mark data" can be generated based on the information of "mark information" of the JDF information updated at step S1807 (FIG. 18).

Further, as shown in FIG. 21, the "changeable mark information" included in the RIP parameter includes information of "HWF changeable mark" and "DFE changeable mark" in the JDF information shown in FIG. 16. For example, as to the changeable mark information of the "HWF changeable mark," the "allocation device" of the RIP parameter is "HWF," and as to the changeable mark information of the "DFE changeable mark," the "allocation device" of the RIP parameter is "DFE.".

When the "allocation device" of the RIP parameter is "HWF," the "item information" and "position information" of the "HWF" are respectively a list of "item information" of the "HWF changeable mark" and a list of "position information" of the "HWF changeable mark" in the JDF information. Further, when the "allocation device" of the RIP parameter is "DFE," the "item information" and "position information" of the "DFE" are respectively a list of "item information" of the "DFE changeable mark," and a list of "position information" of the "DFE changeable mark" in the JDF information.

A description is returned to the flowchart of FIG. 20. When the mark processing unit 206 acquires the analysis result of the JDF information (S2002), the mark processing unit 206 acquires mark information based on the acquired analysis result of the JDF information (S2003). When the mark processing unit 206 acquires the mark information, the mark processing unit 206 determines whether the acquired mark information is changeable mark information (S2004).

If the acquired mark information is the changeable mark information (S2004: YES), the mark processing unit 206 determines whether the acquired changeable mark information is allocated to a specific device that includes the mark processing unit 206 (S2005). Specifically, if the apparatus identification information acquired at step S2001 is a device name of the HWF server 4, and the "allocation device" of the acquired changeable mark information is "HWF," the mark processing unit 206 determines that the acquired changeable mark information is the information allocated to the specific device that includes the mark processing unit 206. Further, if the apparatus identification information acquired at step S2001 is a name of the digital printer, and the "allocation device" of the acquired changeable mark information is "DFE," the mark processing unit 206 determines that the acquired changeable mark information is the information allocated to a specific device that includes the mark processing unit 206.

If the acquired changeable mark information is the information allocated to the specific device that includes the mark processing unit 206 (S2005: YES), the mark processing unit 206 performs the mark processing based on the acquired changeable mark information (S2006). Specifically, if the acquired changeable mark information is the information allocated to the DFE 100, the mark processing unit 206 acquires text information set in each of the changeable text information included in the changeable mark information from the job controller 116. Therefore, based on a determination result at step S2005, the mark processing unit 206 performs the mark processing allocated to the specific device including the mark processing unit 206.

For example, the job controller 116 acquires text information set in the changeable text information included in the RIP parameter from the system controller 113. Specifically, the job controller 116 acquires the apparatus identification information acquired by the system controller 113 as text information indicated by the "device name" set in the changeable text information. Further, for example, when the job data is executed, the job controller 116 acquires an execution date as a "printed date" in the changeable text information via the system controller 113.

Further, for example, when the stored job data stored is executed again, the job controller 116 acquires an execution date when the job data stored is executed again as a "re-printed date" set as the changeable text information via the system controller 113. Further, if the job data is executed for a plurality of times, for example, the latest executed date can be set as the "re-printed date." Further, without differentiating the "printed date" and "re-printed date," the "printed date" can be overwritten by the "re-printed date." Further, the job controller 116 can acquire text information set in other changeable text information with the similar processing.

By contrast, if the acquired changeable mark information is not the information allocated to the specific device that includes the mark processing unit 206 (S2005: NO), the mark processing unit 206 sets a flag of other device (other device flag) to the acquired changeable mark information without performing the mark processing (S2007), in which the other device flag indicates that the mark processing is to be performed at the other device. Therefore, each of the devices performs only the mark processing of the changeable text information allocated by the mark processing allocation unit 422.

By contrast, if the acquired mark information is not the changeable mark information (S2004: NO), the mark processing unit 206 performs the mark processing based on the "non-changeable mark information" of the RIP parameter (S2006). Specifically, based on the "non-changeable mark information," the mark processing unit 206 applies the text mark including text information other than the crop mark, color bar, and changeable text information to superimpose the text mark at a position designated on a print target image.

After performing the mark processing, the mark processing unit 206 determines whether the mark processing is completed for all of the mark information (S2008). If the mark processing is not completed for all of the mark information (S2008: NO), the mark processing unit 206 acquires mark information that is not processed yet (S2003), and repeats the sequence from 52003.

By contrast, if the mark processing is completed for all of the mark information (S2008: YES), the mark processing unit 206 determines whether the other device flag is set for any one of the changeable mark information (S2009). If the changeable mark information set with the other device flag is not detected (S2009: NO), the mark processing unit 206 updates the "RIP status" of the "mark" in the JDF information to "Done" (S2010).

As above described, the attribution information such as parameters for the already-executed mark processing can be erased or deleted from the PDL information. Therefore, if the entire of remaining mark information is processed, and the changeable mark information set with the other device flag is not detected, it is assumed that the mark processing for all of the mark information is completed.

By contrast, if the changeable mark information set with the other device flag is detected (S2009: YES), the mark processing unit 206 ends the sequence while maintaining the "RIP status" of the "mark" at "NotYet."

In the above described example embodiment, the RIP engine 120 compatible to the "pass-through mode" is used as an example. However, in addition to the RIP engine 120 compatible to the "pass-through mode," the RIP engine 120 not compatible to the "pass-through mode" shown in FIG. 9 can perform the above-described mark processing if the apparatus information manager 218 is included.

FIG. 22 is an example of a mark processing result of text marks processed by the sequence shown in FIG. 20. As illustrated in FIG. 22, text information other than the changeable text information processed by the mark processing by any one of the HWF server 4 and the DFE 100 can be output on the top area of an output area of the text mark. Further, the changeable text information processed by the mark processing by the HWF server 4 is output on the middle area of the output area of the text mark, and the changeable text information processed by the mark processing by the DFE 100 is output on the lower area of the output area of the text mark.

As illustrated in FIG. 22, the device name, output date, and operator name processed by the mark processing by the HWF server 4, and the device name, output date (printed date), and operator name processed by the DFE 100 are mutually different. Although the text information acquired by or through the HWF server 4 and the text information acquired by or through the DFE 100 may be different in some cases, in which the text information acquired by or through the HWF server 4 and the text information acquired by or through the DFE 100 can be respectively output as illustrated in FIG. 22.

As to the above described HWF system according to one or more example embodiments, among the text information configuring the text mark, the HWF server 4 allocates the mark processing of the changeable text information acquired from different information sources by or through the HWF server 4 and the DFE 100. Then, the RIP engine 420 disposed in the HWF server 4 acquires information of a specific device that includes the RIP engine 420 based on device information, and the RIP engine 120 disposed in the DFE 100 acquires information of a specific device that includes the RIP engine 120. If the mark processing of the changeable text information allocated to the specific device based on the device information exists, the mark processing is executed.

By performing the above described processing, even if different text information is acquired by or through different devices, the mark processing can be executed for any text information. As to the above described one or more example embodiments, when the RIP processing is performed by a plurality of devices or apparatuses, the marks configured with text information related to the processes can include required text information.

As to the above described one or more example embodiments, the JDF information (FIG. 16) including the changeable mark information can be generated by an allocation operation by an operator of the HWF server 4, or by executing the allocation processing at the HWF server 4. Further, the JDF information can be generated by a combination of the allocation operation by the operator and the allocation processing at the HWF server 4.

In this case, based on the JDF information generated by the allocation operation of the operator, the allocation processing is executed at the HWF server 4 again. If an allocation result by the allocation operation of the operator and an allocation result by the allocation processing of the HWF server 4 have differences, the JDF information is updated by setting a priority to, for example, the allocation processing by the HWF server 4. In this configuration, the re-allocation processing by the HWF server 4 is not required for items having no difference between the allocation operation of the operator and the allocation result the HWF server 4, with which the processing load of the HWF server 4 can be reduced.

Further, as to the above described one or more example embodiments, the HWF server 4 performs the mark processing to the changeable text information designated by "HWF changeable mark" in the JDF information, but not limited hereto. In another case, the HWF server 4 does not perform the mark processing, but the HWF server 4 acquires information (e.g., operator name, output date) required for the mark processing of the changeable text information designated by "HWF changeable mark," and transmits the information to the DFE 100.

In this case, the information acquired by or through the HWF server 4 is transmitted to the DFE 100, and the DFE 100 executes the mark processing allocated to the DFE 100, and also the mark processing allocated to the HWF server 4 by using the information transmitted from the HWF server 4. With employing this configuration, for example, when it is set that the mark processing of the mark information other than the changeable text information is to be executed by the DFE 100, all of the mark processing can be executed by the DFE 100. Further, in this case, since the intermediate data processed by the mark processing by the HWF server 4 is not required to be transmitted to the DFE100, the transmission load to the DFE 100 can be reduced.

Further, as to the above described one or more example embodiments, when the mark processing is to be executed for one job data, the mark processing of the changeable text information is allocated to the HWF server 4 and the DFE 100, but not limited hereto. In another case, when one job data is divided into a plurality of sub job data based on a dividing request as above described, the mark processing of the changeable text information acquired for each of the plurality of sub-job data can be allocated to the DFE 100 disposed at each of a plurality of corresponding printers that can execute the corresponding sub-job data.

FIG. 23 is another example of a mark processing result of text marks when one job data is divided into a plurality of sub-job data. As illustrated in FIG. 23, in addition to the text information illustrated in FIG. 22, each of device names (printer names) having different information that execute the corresponding sub job data, and different page range where an print output operations is performed by each of different devices are output on the sheet.

Further, as to the above described one or more example embodiments, the mark information is processed by the mark processing at a position designated in the JDF information, but not limited hereto. In another case, if the entire of text information to be processed by the mark processing cannot be fit in the designated position (first position), the mark processing unit 206 determines a second position in the bleed area where the mark processing can be executed while fitting the entire of text information, and then the mark processing unit 206 executes the mark processing of the text information on the second position in the bleed area.

As to the above described one or more example embodiments, when the mark processing is to be executed for each of text information acquired by or through a plurality of devices, the number of to-be-output text information may become greater or longer. With employing this configuration, even if the number of to-be-output text information becomes greater or longer and thereby the entire of text information cannot be output (printed) on the first position, the entire of text information can be output at the second position (different position) by executing the mark processing.

As to the above described one or more example embodiments, when the RIP processing is performed by using a plurality of devices, the mark configured by text information indicating one or more processes can include required text information.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G- compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An image processing system for sequentially executing a plurality of processes, comprising:
   a process execution control apparatus to control an execution of the plurality of processes; and
   an image generation-output control apparatus to control an execution of an image generation-output operation,
   wherein the process execution control apparatus includes:
   a control-side drawing information generator to generate drawing information to be referred by an image forming apparatus in performing the image generation-output operation, based on information of a target image to be output; and
   a process allocator to allocate a plurality of text information adding processes to the process execution control apparatus and the image generation-output control apparatus when generating the drawing information, the text information adding processes each adding text information to the information of the target image,
   wherein the image generation-output control apparatus includes;
   an output-side drawing information generator corresponding to the control-side drawing information generator,
   wherein the process allocator allocates the text information adding processes to the process execution control apparatus and the image generation-output control apparatus for each of the text information acquirable from different information sources through the process execution control apparatus and the image generation-output control apparatus,
   wherein the control-side drawing information generator acquires first apparatus identification information identifying a first apparatus disposed with the control-side drawing information generator, determines the text information adding processes allocated to the process execution control apparatus based on the acquired first apparatus identification information, and executes one or more of the text information adding processes allocated to the process execution control apparatus based on a first determination result,
   wherein the output-side drawing information generator acquires second apparatus identification information identifying a second apparatus disposed with the control-side drawing information generator based on the acquired second apparatus identification information, determines the text information adding processes allocated to the image generation-output control apparatus based on the acquired apparatus identification information, and executes one or more of the text information adding processes allocated to the image generation-output control apparatus based on a second determination result.

2. The image processing system of claim 1, wherein the process allocator allocates the text information adding processes each adding the text information having different contents from one another to the process execution control apparatus and the image generation-output control apparatus, according to an operation status of the process execution control apparatus and an operation status of the image generation-output control apparatus.

3. The image processing system of claim 1, wherein the process allocator allocates at least one of the text information adding processes that adds text information indicating an operator of the process execution control apparatus to the process execution control apparatus,
   wherein the process allocator allocates at least one of the text information adding processes that adds text information indicating an operator of the image generation-output control apparatus to the image generation-output control apparatus.

4. The image processing system of claim 1, wherein the control-side drawing information generator acquires the text information to be added by executing one or more of the allocated text information adding processes, outputs the acquired text information to the image generation-output control apparatus, and the output-side drawing information generator adds the text information output from the control-side drawing information generator.

5. A method of controlling an image processing system for sequentially executing a plurality of processes, the image processing system including a process execution control apparatus to control an execution of the plurality of processes, and an image generation-output control apparatus to control an execution of image generation-output operation, the method comprising:
   generating first drawing information to be referred by an image forming apparatus when the image forming apparatus performs the image generation-output operation based on information of a target image to be output by the process execution control apparatus;
   generating second drawing information based on the information of the target image at the image generation-output control apparatus in view of the first drawing information generated at the process execution control apparatus,
   allocating a plurality of text information adding processes to the process execution control apparatus and the image generation-output control apparatus when generating the first drawing information or the second drawing information, the text information adding processes each adding text information to the information of the target image and each acquirable from different information sources through the process execution control apparatus and the image generation-output control apparatus, executing one or more of the text information adding processes allocated to the process execution control apparatus at the process execution control apparatus; and executing one or more of the text information adding processes allocated to the image generation-output control apparatus at the image generation-output control apparatus.

6. An image generation-output control apparatus to control execution of an image generation-output operation based on command information received from a process execution control apparatus to control execution of a plurality of processes to be executed sequentially in an image processing system, wherein the process execution control apparatus includes:

a control-side drawing information generator to generate drawing information to be referred by an image forming apparatus in performing the image generation-output operation, based on information of a target image to be output; and a process allocator to allocate a plurality of text information adding processes to add given text information related to the plurality of processes to the information of the target image when generating the drawing information, the process allocator allocating the plurality of text information adding processes for each of the text information obtained from different information sources, wherein the image generation-output control apparatus comprises:

an identification information acquiring unit to acquire identification information for identifying the image generation-output control apparatus;

a process determination unit to determine the text information adding processes allocated to the image generation-output control apparatus by the process allocator based on the acquired identification information; and an execution control unit to instruct an output-side drawing information generator, corresponding to the control-side drawing information generator, to execute one or more of the text information adding processes allocated to the image generation-output control apparatus based on a determination result of the text information adding processes.

7. The image generation-output control apparatus of claim 6 wherein the control-side drawing information generator acquires the text information to be added by executing one or more of the allocated text information adding processes, and outputs the acquired text information to the image generation-output control apparatus, and the execution control unit instructs the output-side drawing information generator to add the text information output from the control-side drawing information generator.

8. A non-transitory storage medium storing a program that, when executed by a computer, causes the computer to execute a method of controlling an image generation-output control apparatus in an image processing system for sequentially executing a plurality of processes, the image processing system including a process execution control apparatus to control execution of the plurality of processes, and the image generation-output control apparatus to control execution of image generation-output operation, wherein the process execution control apparatus includes:

a control-side drawing information generator to generate drawing information to be referred by an image forming apparatus in performing the image generation-output operation, based on information of a target image to be output; and a process allocator to allocate a plurality of text information adding processes to add given text information related to the plurality of processes to the information of the target image when generating the drawing information, the process allocator allocating the plurality of text information adding processes for each of the text information obtained from different information sources, wherein the method comprises:

acquiring identification information for identifying the image generation-output control apparatus;

determining the text information adding processes allocated to the image generation-output control apparatus by the process allocator based on the acquired identification information; and instructing an output-side drawing information generator, corresponding to the control-side drawing information generator, to execute one or more of the text information adding processes allocated to the image generation-output control apparatus based on a determination result of the text information adding processes.

9. The non-transitory storage medium storing the control program of claim 8, the method further comprising:

acquiring the text information to be added by executing one or more of the allocated text information adding processes by the control-side drawing information generator;

outputting the acquired text information to the image generation-output control apparatus from the control-side drawing information generator; and instructing the output-side drawing information generator to add the text information output from the control-side drawing information generator.

10. A method of controlling an image generation-output control apparatus in an image processing system for sequentially executing a plurality of processes, the image processing system including a process execution control apparatus to control execution of the plurality of processes, and the image generation-output control apparatus to control execution of image generation-output operation based on command information received from a process execution control apparatus, wherein the process execution control apparatus includes:

a control-side drawing information generator to generate drawing information to be referred by an image forming apparatus in performing the image generation-output operation, based on information of a target image to be output; and a process allocator to allocate a plurality of text information adding processes to add given text information related to the plurality of processes to the information of the target image when generating the drawing information, the process allocator allocating the plurality of text information adding processes for each of the text information obtained from different information sources, wherein the method comprises:

acquiring identification information for identifying the image generation-output control apparatus;

determining the text information adding processes allocated to the image generation-output control apparatus by the process allocator based on the acquired identification information; and instructing an output-side drawing information generator, corresponding to the control-side drawing information generator, to execute one or more of the text information adding processes allocated to the image generation-output control apparatus based on a determination result of the text information adding processes.

11. An image processing system for sequentially executing a plurality of processes, comprising:

a process execution control apparatus to control execution of the plurality of processes; and an image generation-output control apparatus to control execution of an image generation-output operation based on command information;

a control-side drawing information generator to generate drawing information to be referred by an image forming apparatus in performing the image generation-output operation, based on information of a target image to be output; and a process allocator to allocate a plurality of text information adding processes to add given text information related to the plurality of processes to the information of the target image when generating the drawing information, the process allocator allocating the plurality of text information adding processes for each of the text information obtained from different information sources;

an identification information acquiring unit to acquire identification information for identifying the image generation-output control apparatus;

a process determination unit to determine the text information adding processes allocated to the image generation-output control apparatus by the process allocator based on the acquired identification information; and an execution control unit to instruct an output-side drawing information generator, corresponding to the control-side drawing information generator, to execute one or more of the text information adding processes allocated to the image generation-output control apparatus based on a determination result of the text information adding processes.

* * * * *